United States Patent
Hwang et al.

(10) Patent No.: US 9,369,232 B2
(45) Date of Patent: Jun. 14, 2016

(54) APPARATUS, SYSTEMS AND METHODS FOR IMPULSE NOISE DETECTION AND MITIGATION

(75) Inventors: Chan-Soo Hwang, Sunnyvale, CA (US); Mithat Dogan, San Jose, CA (US); John M. Cioffi, Atherton, CA (US); Mark B. Flowers, Los Gatos, CA (US); Sina Barkeshli, Saratoga, CA (US)

(73) Assignee: Adaptive Spectrum and Signal Alignment, Inc., Redwood City, CA (US)

(*) Notice: Subject to any disclaimer, the term of this patent is extended or adjusted under 35 U.S.C. 154(b) by 0 days.

(21) Appl. No.: 14/399,151

(22) PCT Filed: May 7, 2012

(86) PCT No.: PCT/US2012/036843
§ 371 (c)(1),
(2), (4) Date: Nov. 5, 2014

(87) PCT Pub. No.: WO2013/169228
PCT Pub. Date: Nov. 14, 2013

(65) Prior Publication Data
US 2015/0124891 A1 May 7, 2015

(51) Int. Cl.
| H04L 1/00 | (2006.01) |
| H04L 1/20 | (2006.01) |
| H04M 3/00 | (2006.01) |
| H04M 3/22 | (2006.01) |

(52) U.S. Cl.
CPC .......... *H04L 1/0015* (2013.01); *H04L 1/0009* (2013.01); *H04L 1/0017* (2013.01); *H04L 1/0026* (2013.01); *H04L 1/20* (2013.01);
(Continued)

(58) Field of Classification Search
CPC ......... H04L 1/0015; H04L 1/20; H04L 1/009; H04L 1/0017; H04L 1/0026
USPC .......................................... 375/257
See application file for complete search history.

(56) References Cited

U.S. PATENT DOCUMENTS

| 2006/0078044 A1 | 4/2006 | Norrell et al. |
| 2009/0164212 A1* | 6/2009 | Chan et al. ................. 704/226 |
| 2009/0177938 A1 | 7/2009 | Pons et al. |

FOREIGN PATENT DOCUMENTS

| WO | WO-2006102125 | 9/2006 |
| WO | WO-2008016585 | 2/2008 |
| WO | WO-2010028018 | 3/2010 |

OTHER PUBLICATIONS

International Search Report and Written Opinion for International Patent Application No. PCT/US2012/036843, Mailed Nov. 29, 2012, 14 pages.

(Continued)

*Primary Examiner* — Michael Neff
(74) *Attorney, Agent, or Firm* — Green, Howard & Mughal LLP

(57) ABSTRACT

In accordance with embodiments disclosed herein, there are provided apparatus, systems and methods for impulse noise detection and mitigation. For example, in one embodiment such means include, means for detecting impulse noise; means for classifying the detected impulse noise into one of a plurality of impulse noise classes affecting communications on a Digital Subscriber Line (DSL line); means for selecting a noise mitigation strategy from among a plurality of noise mitigation strategies; means for applying the selected noise mitigation strategy; and means for validating application of the noise mitigation strategy.

55 Claims, 12 Drawing Sheets

(52) U.S. Cl.
CPC ............ *H04M3/007* (2013.01); *H04M 3/2209* (2013.01); *H04L 2001/0093* (2013.01)

(56) References Cited

OTHER PUBLICATIONS

International Search Report and Written Opinion for International Patent Application No. PCT/US2013/061195, Mailed May 13, 2014, 11 pages.

International Preliminary Report on Patentability for International Patent Application No. PCT/US2012/036843, Mailed Nov. 20, 2014, 11 pages.

Fantacci, Romano, et al. "Impulse Noise Mitigation Techniques for xDSL Systems in a Real Environment", IEEE Transactions on Consumer Electronics, IEEE Service Center, New York, NY, US, vol. 56, No. 4, Nov. 1, 2010, pp. 2106-2114, XP011341798.

* cited by examiner

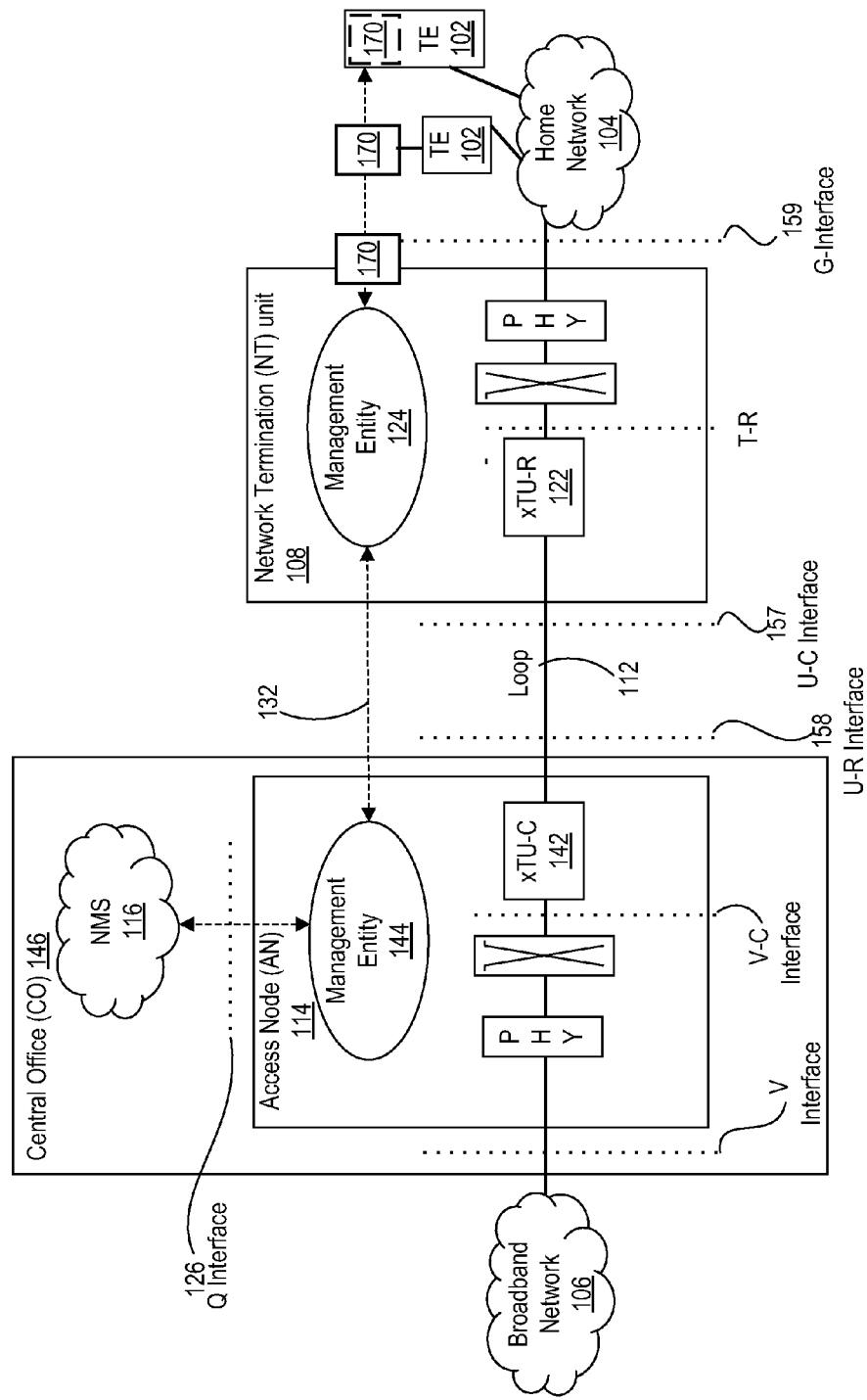

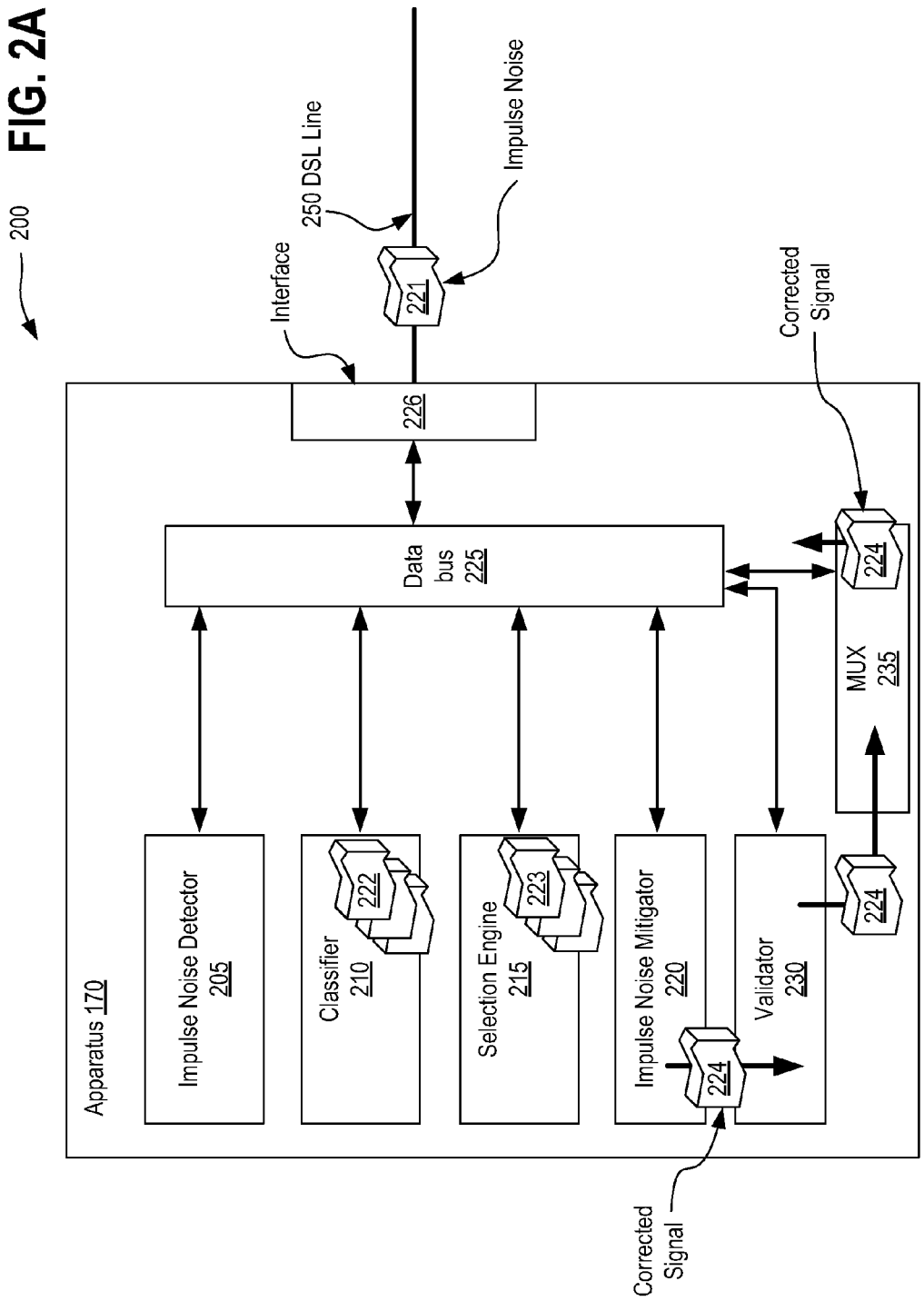

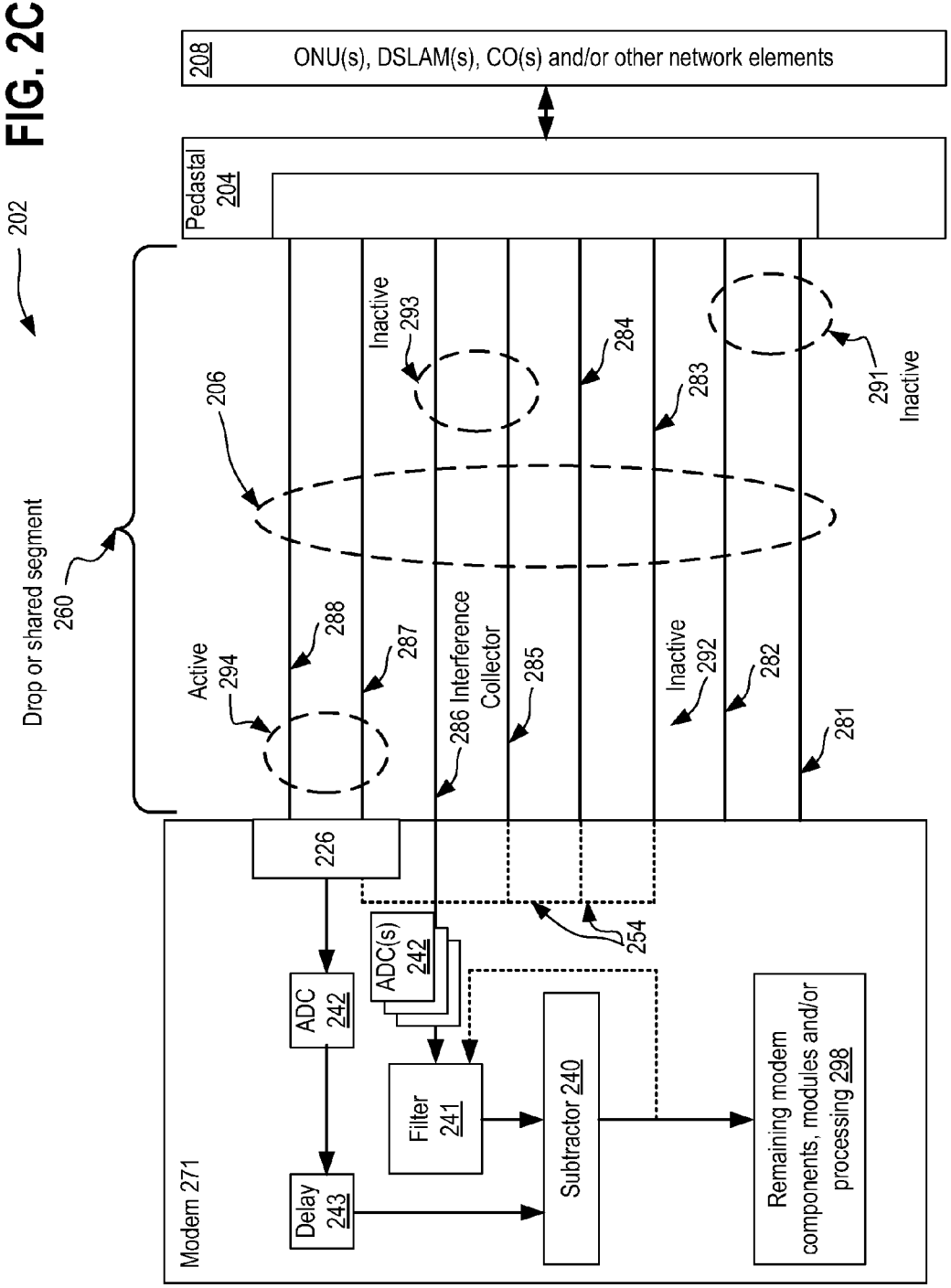

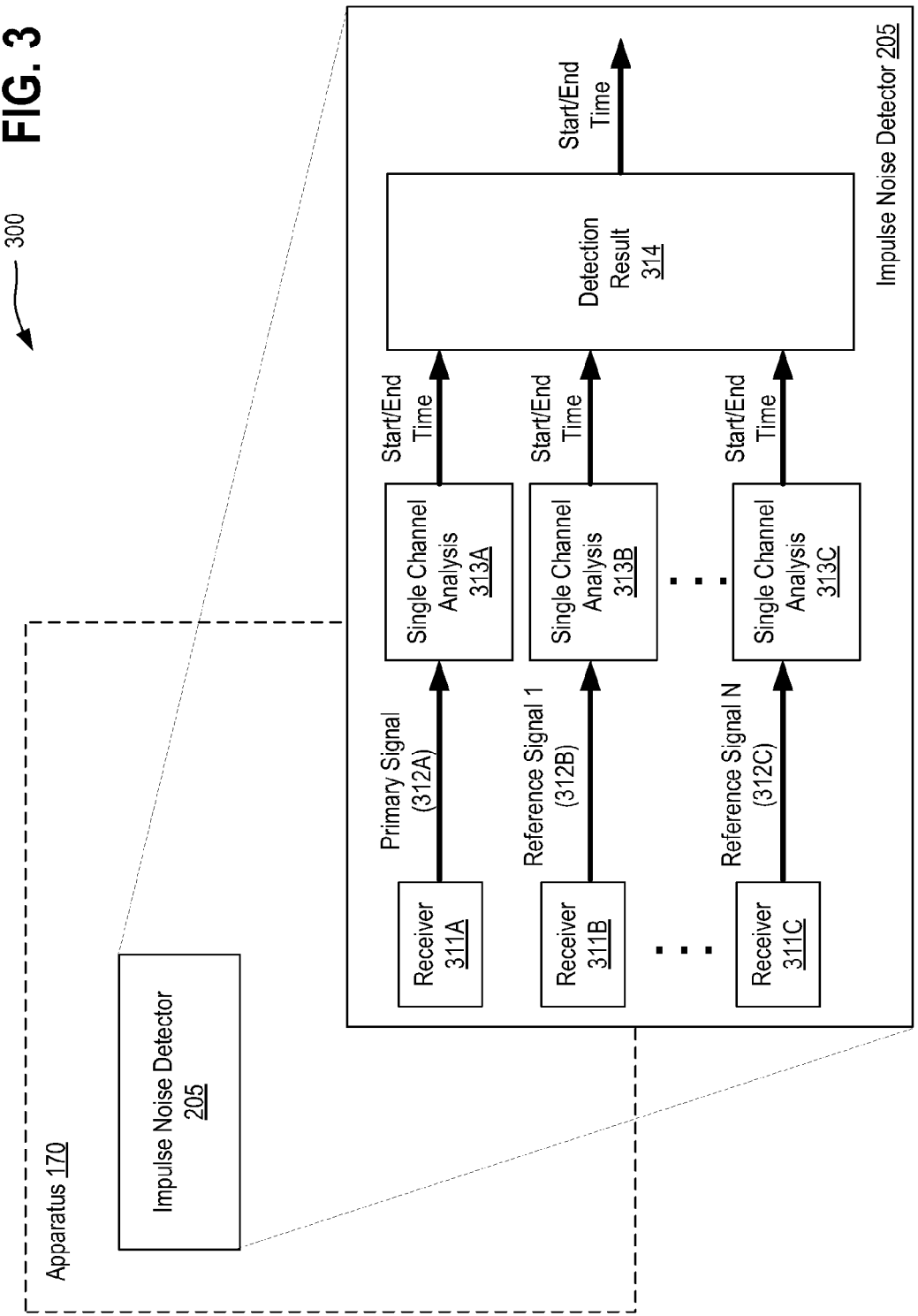

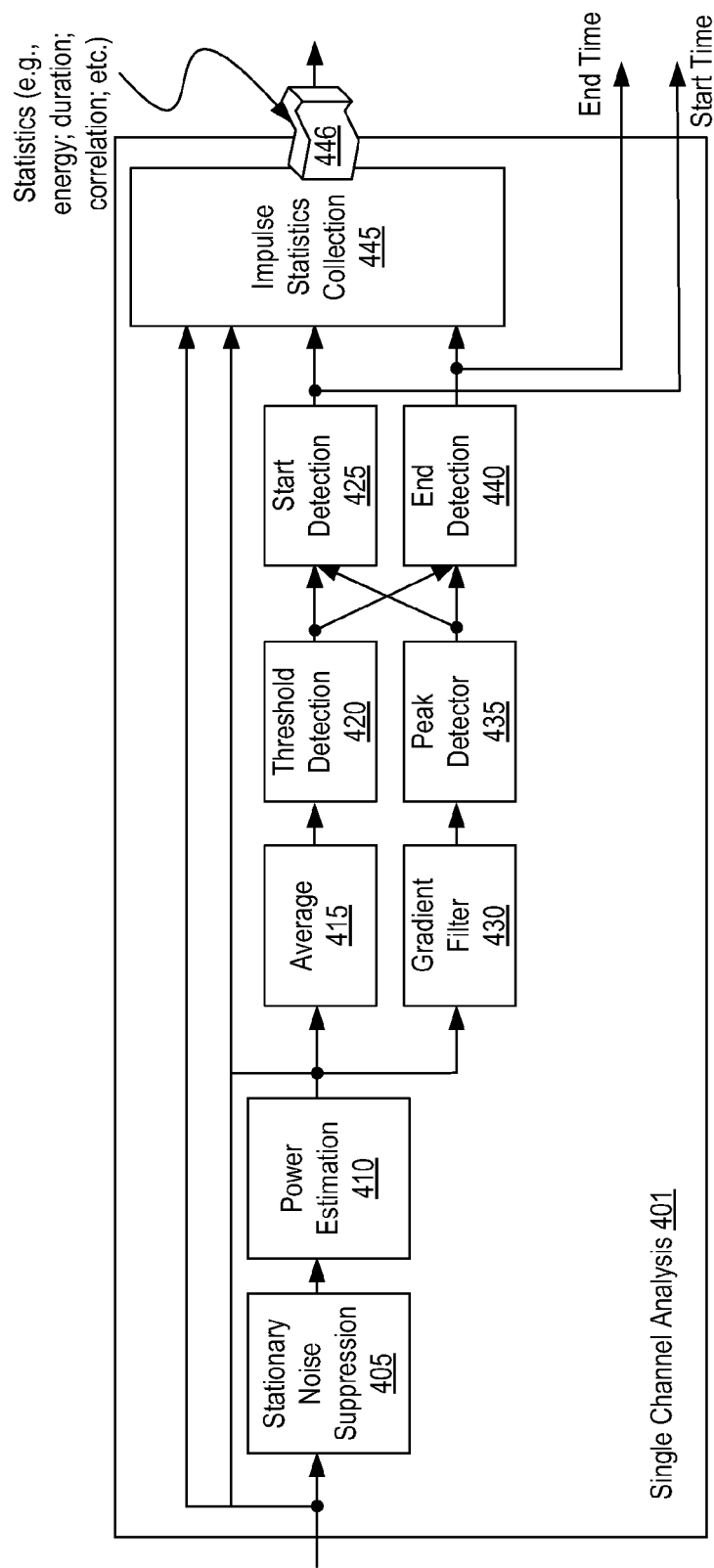

US 9,369,232 B2

APPARATUS, SYSTEMS AND METHODS FOR IMPULSE NOISE DETECTION AND MITIGATION

CLAIM OF PRIORITY

This application is a U.S. National Phase application under U.S.C. §371 of International Application No. PCT/US2012/036843, filed May 7, 2012, entitled "APPARATUS, SYSTEMS AND METHODS FOR IMPULSE NOISE DETECTION AND MITIGATION", the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to apparatuses, systems and methods for impulse noise mitigation.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

In the telecommunication arts, Digital Subscriber Lines (DSL lines) provide internet connectivity to subscribers, including residential and business users. In the course of operating a DSL line, it is common for people to turn on and off devices that create impulses affecting communication on the DSL lines. Such impulses are not always present, but when caused by, for example, turning on a device, the impulse noise may completely wipe out transmitted DSL signal communications or cause severe degradation to them. Washers, dryers, microwaves, and other such devices are capable of creating electrical surges that interfere with the DSL communications on a DSL line. To remedy such interference, it is common for error correction code (ECC) to be used, but ECC has a long time span and when combined with interleaving techniques, the ECC and interleaved DSL communication signals result in a long delay (exhibited as latency) because communications must be buffered so that data can be recovered from a damaged signal, resulting in an ongoing latency for ongoing latency that is not acceptable for delay sensitive applications.

Moreover, because the ECC and interleaving may be utilized over a long period of time, it may appear as the modem itself is performing at less than optimal levels. Because ECC adds redundancy, the net rate will be decreased. Should the redundancy owing to the ECC continue to be added, even if there is no impulse noise present, overall operation of the modem will suffer as the redundancy is being introduced to solve a no longer existing problem.

The present state of the art may therefore benefit from apparatuses, systems, and methods for impulse noise detection and mitigation as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1 illustrates an exemplary architecture in which embodiments may operate;

FIG. 2A illustrates an alternative exemplary architecture in accordance with which embodiments may operate;

FIG. 2C illustrates an alternative exemplary architecture in accordance with which embodiments may operate;

FIG. 3 illustrates an alternative exemplary architecture in accordance with which embodiments may operate;

FIG. 4 illustrates an alternative exemplary architecture in accordance with which embodiments may operate;

DETAILED DESCRIPTION

Figure 2B:
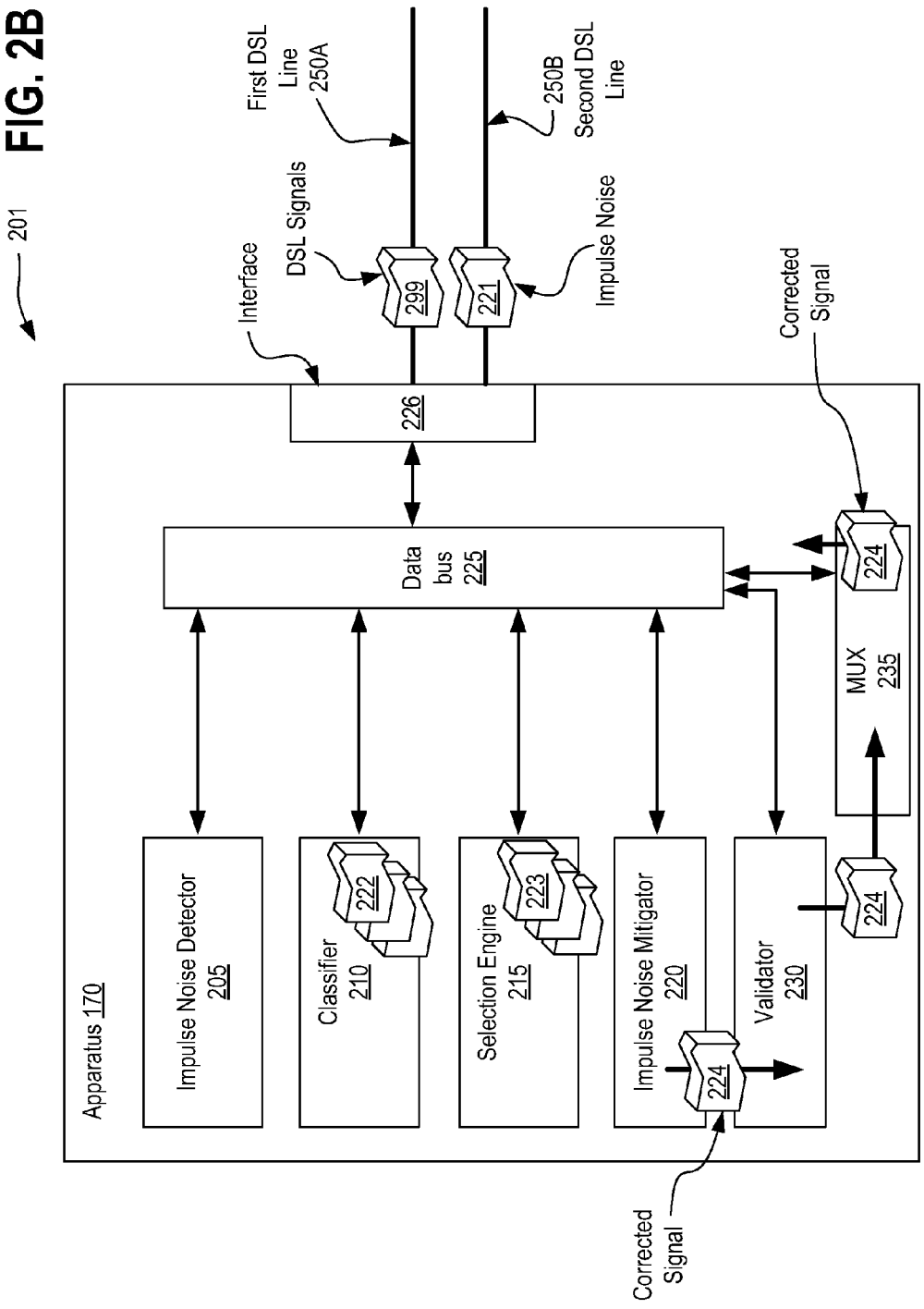
FIG. 2B illustrates an alternative exemplary architecture in accordance with which embodiments may operate.

Described herein are apparatuses, systems, and methods for impulse noise detection and mitigation. In accordance with one embodiment, means for impulse noise detection and mitigation are disclosed. Such means may include, for example, means for detecting impulse noise affecting communications on a Digital Subscriber Line (DSL line); means for classifying the detected impulse noise into one of a plurality of impulse noise classes; means for selecting a noise mitigation strategy from among a plurality of noise mitigation strategies; means for applying the selected noise mitigation strategy; and means for validating application of the noise mitigation strategy.

According to one embodiment, validation includes comparing corrected signals with uncorrected signals or passing the signals to another filter and then comparing the filtered signals with uncorrected signals. Thus, a "corrected" signal may be a signal that has undergone a noise mitigation strategy or filtering, or both. In other embodiments, there are multiple corrected signals to compare, and thus, validation is performed for the multiple corrected signals. Where more than one filtering or noise mitigation strategy provides some beneficial effect, a scoring mechanism can provide for systematic selection of the most desirable filter or noise mitigation strategy applied, or the best combination of filters and/or noise mitigation strategies applied in the generation of a corrected signal, as appropriate. For example, while the best reference signal may be the most desirable to apply to a primary signal carrying a DSL signal or DSL traffic, it may not be knowable in advance which of multiple reference signals is the best one. Therefore, in certain embodiments, cancellation is applied from one reference signal to another reference signal, without involving the primary signal, and then a positive effect of cancellation between reference signals provides an indication of cancellation that may be applied to the primary signal. Such a technique helps to avoid the additional DSL signal energy on the primary line as the second reference line subjected to cancellation may be subject to the same interference and impulse noise as the primary line but will not be saturated by DSL signal data as is the case with a primary line carrying an active DSL signal.

In one embodiment, a reference channel is used in accordance with a given impulse noise mitigation strategy. The reference channel is separate from a primary channel used to carry the DSL communication (e.g., payload data and other information transmitted on the DSL line pursuant to providing DSL services to a DSL subscriber). Impulse noise may be attempted to be detected on all available channels, but the described mechanisms will nevertheless engage even when impulse is only detected on a single channel, which may be a reference channel or the primary channel. Accordingly, impulse noise characteristics may be identified based on the primary channel or the reference channel or both. Clustering may be applied to collected impulse noise samples and impulse noise characteristics to provide impulse noise cancellation and mitigation strategies. Detected impulse noises may then be mitigated based on an applied mitigation strategy taken from the available impulse noise mitigation strategies.

Certain entities may provide impulse noise detection and mitigation through the provisioning of a so enabled device, such as a DSL modem, an appropriate DSL modem chipset, a signal optimizer communicatively interfaced between a DSL modem and a DSL line, or via a service which performs computation and optimization instructions for a DSL service subscriber. In some embodiments, such a service is provided in conjunction with a compatible device as is described herein.

Impulse noise detection and mitigation services may be provided by a third party, distinct from the DSL operator which provides the DSL services to the DSL service subscriber. For instance, such a service provider may attempt to cancel the impulse noises as they occur so that an operator of the DSL service sees a minimum of the impulse noise or potentially none at all. Monitoring lines, pre-qualifying lines, or both for the sake of impulse cancellation may further benefit application layer controls (e.g. ARQ), regardless of whether or not hardware is deployed. For example, such monitoring and pre-qualification could help shape a deployment strategy so that more expensive and sophisticated hardware is deployed in those locations where the most benefit can be attained, and locations which are determined to have a lesser benefit could be delayed or simply not selected. Further still, monitoring of lines can provide further data points upon which effectiveness of deployed impulse noise detection and mitigation hardware can be evaluated or by which locations in need of such hardware could be identified as the operational landscape of DSL system changes over time. Where utilized, real-time impulse noise mitigation improves customer experience for the DSL subscriber through improved and more reliable performance, and by extension, improves business conditions for the DSL operator through enhanced customer satisfaction and decreased technical support for intermittent communication faults or degraded DSL modem performance.

A third party service provider of impulse noise detection and mitigation services may additionally pass information to upper communication layers (e.g., ARQ) so that the upper layers can customize better solutions for the impulse noise cancellation. For instance, In practice, even where impulse noise cancellation (INC) hardware is present, it may nevertheless be beneficial to jointly optimize ECC, INC, or even ECC, INC, and ARQ. Therefore, data collected from the monitoring of lines, may be utilized to optimize ECC and ARQ operational parameters, such that upper layers can customize their solutions by combining INC/ECC/ARQ for the best possible performance of a customer's active DSL line.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within an apparatus to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate in compliance with the G.997.1 standard (also known as G.ploam). Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+ (G.992.5) and the G.993.x emerging Very-high-speed Digital Subscriber Line or Very-high-bitrate Digital Subscriber Line (VDSL) standards, as well as the G.991.1 and G.991.2 Single-Pair High-speed Digital Subscriber Line (SHDSL) standards, all with and without bonding.

The G.997.1 standard specifies the physical layer management for ADSL transmission systems based on the clear, Embedded Operation Channel (EOC) defined in G.997.1 and use of indicator bits and EOC messages defined in the G.992.x, G.993.x and G.998.4 standards. Moreover, G.997.1 specifies network management elements content for configuration, fault and performance management. In performing the disclosed functions, systems may utilize a variety of operational data (which includes performance data) that is available at an Access Node (AN).

In FIG. 1, users terminal equipment 102 (e.g., a Customer Premises Equipment (CPE) device or a remote terminal device, network node, LAN device, etc.) is coupled to a home network 104, which in turn is coupled to a Network Termination (NT) Unit 108. Multiple xTU devices ("all Transceiver Unit" devices) are further depicted. An xTU provides modulation for a DSL loop or line (e.g., DSL, ADSL, VDSL, etc.). In one embodiment, NT unit 108 includes an xTU-R (xTU Remote), 122 (for example, a transceiver defined by one of the ADSL or VDSL standards) or any other suitable network termination modem, transceiver or other communication unit. NT unit 108 also includes a Management Entity (ME) 124. Management Entity 124 may be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program; via Transaction Language 1 (TL1) commands, TL1 being a long-established command language used to program responses and commands between telecommunication network elements; or via a TR-69 based protocol. "TR-69" or "Technical Report 069" is in reference to a DSL Forum technical specification entitled CPE WAN Management Protocol (CWMP) which defines an application layer protocol for remote management of end-user devices. XML or "eXtended Markup Language" compliant programming and interface tools may also be used.

Each xTU-R 122 in a system may be coupled with an xTU-C (xTU Central) in a Central Office (CO) or other central location. The xTU-C 142 is located at an Access Node (AN) 114 in Central Office 146. A Management Entity (ME) 144 likewise maintains an MIB of operational data pertaining to xTU-C 142. The Access Node 114 may be coupled to a broadband network 106 or other network, as will be appreciated by those skilled in the art. Each of xTU-R 122 and xTU-C 142 are coupled together by a U-interface/loop 112, which in the case of ADSL may be a twisted pair line, such as a telephone line, which may carry other communication services besides DSL based communications. Apparatus 170 may be managed or operated by a service provider of the DSL services or may be operated by a third party, separate from the entity which provides DSL services to end-users. Thus, in accordance with one embodiment apparatus 170 is operated and managed by an entity which is separate and distinct from a telecommunications operator responsible for a plurality of digital communication lines. Management Entity 124 or Management Entity 144 may further store information collected from apparatus 170 within an associated MIB.

Several of the interfaces shown in FIG. 1 are used for determining and collecting operational data. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from xTU-C 142, while far-end parameters from xTU-R 122 may be derived by either of two interfaces over the U-interface. Indicator bits and EOC messages may be sent using embedded channel 132 and provided at the Physical Medium Dependent (PMD) layer, and may be used to generate the required xTU-R 122 parameters in ME 144. Alternately, the Operations, Administration and Maintenance (OAM) channel and a suitable protocol may be used to retrieve the parameters from xTU-R 122 when requested by Management Entity 144. Similarly, the far-end parameters from xTU-C 142 may be derived by either of two interfaces over the U-interface. Indicator bits and EOC message provided at the PMD layer may be used to generate the required xTU-C 142 parameters in Management Entity 124 of NT unit 108. Alternately, the OAM channel and a suitable protocol may be used to retrieve the parameters from xTU-C 142 when requested by Management Entity 124.

At the U-interface (also referred to as loop 112), there are two management interfaces, one at xTU-C 142 (the U-C interface 157) and one at xTU-R 122 (the U-R interface 158). The U-C interface 157 provides xTU-C near-end parameters for xTU-R 122 to retrieve over the U-interface/loop 112. Similarly, the U-R interface 158 provides xTU-R near-end parameters for xTU-C 142 to retrieve over the U-interface/loop 112. The parameters that apply may be dependent upon the transceiver standard being used (for example, G.992.1 or G.992.2). The G.997.1 standard specifies an optional Operation, Administration, and Maintenance (OAM) communication channel across the U-interface. If this channel is implemented, xTU-C and xTU-R pairs may use it for transporting physical layer OAM messages. Thus, the xTU transceivers 122 and 142 of such a system share various operational data maintained in their respective MIBs.

Depicted within FIG. 1 is apparatus 170 operating at various optional locations in accordance with several alternative embodiments. For example, in accordance with one embodiment, apparatus 170 is located within terminal equipment 102 connecting the DSL line to a LAN which establishes home network 104. Alternatively, the apparatus 170 may be connected with the phone line that supplies the DSL connection and the apparatus 170 then in turn connects with the terminal equipment 102 which then is connected to a LAN which establishes home network 104. In one embodiment apparatus 170 operates as a DSL modem, such as a Customer Premises (CPE) modem. In another embodiment, apparatus 170 operates as a controller card or as a chipset within a user's terminal equipment 102 (e.g., a Customer Premises Equipment (CPE) device or a remote terminal device, network node, etc.) connecting the DSL line to the home network 104 as depicted. In another embodiment, apparatus 170 operates as a separate and physically distinct stand alone unit which is connected between the user's terminal equipment 102 and a DSL line or loop. For example, apparatus 170 may operate as a stand-alone signal conditioning device. In yet another embodiment, apparatus 170 is connected with a NT unit 108 or with xTU-R 122 over the G-interface 159.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For an example Public Switched Telephone Network (PSTN) used to provide DSL services, customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a broadband communications service provider offer services that diagnose or improve broadband communications services (DSL, DSL services, cable, etc.).

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed/Very high-bit-rate DSL (VDSL). Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt-.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.993.5 for DSL modems supporting Vectoring, I.T.U. standard G.998.4 for DSL modems supporting retransmission functionality, I.T.U. standard G.994.1 (G.hs) for modems implementing handshake, and/or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services, it should be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, broadband power-line systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ONU) may be used.

The phrases "coupled to," "coupled with," "connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

FIG. 2A illustrates an alternative exemplary architecture 200 in which embodiments may operate. FIG. 2A depicts an apparatus 170 which is communicably interfaced to a first end of a Digital Subscriber Line (DSL line) 250, for example, through an interface 226 of the apparatus 170. Apparatus 170 includes several components which are interconnected through a data bus 225.

In accordance with one embodiment, apparatus 170 includes: an impulse noise detector 205 to detect impulse noise 221 affecting communications on the DSL line 250; a classifier 210 to classify the detected impulse noise 221 into one of a plurality of impulse noise classes 222; a selection engine 215 to select a noise mitigation strategy 223 from among a plurality of noise mitigation strategies 223 based on the impulse noise class 222 of the detected impulse noise 221; an impulse noise mitigator 220 to apply the selected noise mitigation strategy 223 to generate a corrected signal; a validator 230 to validate application of the noise mitigation strategy 223 based on the corrected signal 224; and a multiplexor (MUX) 235 to release the corrected signal 224 onto the DSL line 250 when the validator 230 positively validates application of the noise mitigation strategy 223.

Canceling non-stationary noises requires the cancellation of noise that comes and goes in contrast to noise which is exhibited as persistent, constant, and predictable interference (e.g., stationary). Interference noise associated with AM radio and crosstalk are therefore not considered impulse noise as they do not exhibit non-stationary characteristics, given that each is relatively constant. In accordance with one embodiment, detecting impulse noise 221 includes detecting an impulse noise 221 which is characterized as one of: (a) a narrowband non-stationary noise causing interference on a narrow range of spectrum; or (b) a broadband non-stationary noise causing interference across a broad range of spectrum. For example, noise associated with HAM radio (also known as amateur radio) is narrowband because it occupies a relatively small range of wireless spectrum and is non-stationary because the noise corresponds to intermittent communications over radio equipment by HAM radio operators. Various types of impulse noise will generally require or benefit from specialized impulse noise mitigation techniques.

Impulse noise may further be characterized as non-stationary noise of a very short duration (e.g., typically milliseconds in duration but can be seconds in duration as with, for example impulse noise associated with HAM radio). For example short duration may be one that is less in duration than the ADSL signaling superframe of the physical layer.

In one embodiment, detecting impulse noise 221 includes detecting the impulse noise in real-time. In contrast to long-term interference mitigation strategies for predictable and consistent stationary noise affecting the DSL line 250, impulse noise must be detected and acted upon quickly if the mitigation attempt is to have a benefit to the active DSL communications on the DSL line 250. Because the impulse noise 221 event is of such a short duration, waiting any significant period of time allows the impulse noise event to negatively affect the DSL line 250 without the opportunity to immediately mitigate the event. Thus, real-time mitigation strategies are optimal. This is in contrast solutions which address persistent, predictable, and stationary type noises (e.g., not "impulse" type noises) by introducing, for example, interleaving and other related mitigating strategies. Even for stationary noises (persistent, predictable), "real-time" noise cancellation may be implemented. However, because such noises are stationary, it is not necessary to "control" the noise canceller in real time. On the other hand, for non-stationary noises, because the impulse noises come and go and because the types of impulse changes from time to time, it becomes necessary "control" the noise cancellation in real time. Control of noise canceling strategies for persistent noises may be implemented by adapting filters. For impulse noises, a much tighter and more responsive control is necessary since the cancellation strategies change abruptly. Thus, in accordance with one embodiment, the impulse noise mitigator 220 applies or implements a short-term impulse noise mitigation strategy 223 responsive to detecting the impulse noise in real-time.

In one embodiment the apparatus 170 further communicates instructions to terminate a long-term noise mitigation strategy affecting operational parameters of the DSL line. For example, the apparatus 170 may communicate such instructions internally via the data bus 225 or may communicate such instructions to another entity via interface 226. In accordance with one embodiment, a short-term impulse noise mitigation strategy includes a defined duration to remain in effect. Thus, a short-term impulse noise mitigation strategy will self terminate or cease to have any affect after its defined duration. In such an embodiment, a long-term noise mitigation strategy remains in effect until terminated. Thus, a long-term noise mitigation strategy is implemented for an indefinite period and does not have a defined duration to remain in effect. In accordance with one embodiment, the apparatus 170 may additionally communicate instructions to implement a long-term noise mitigation strategy affecting operational parameters of the DSL line 250.

In one embodiment, the long-term strategy noise mitigation involves use of an interleaver. With impulse noise mitigation strategies, it may be advantageous to turn off the interleaver improve the latency of the communications on the DSL line 250. In addition to instituting a short-term mitigating strategy for the detected impulse noise 221 event, long term strategies and solutions may be communicated to higher communication protocols. Such higher protocols may then observe the communicated long term strategy and issue instructions responsively, yet will not themselves seek to institute changes for canceling the impulse noise 221 event which is to be mitigated through the short-term impulse noise mitigation strategy selected and applied. Long term strategies may involve gathering statistics over time regarding the operation of the DSL line and issuing changed code parameters based on the gathered statistics.

In one embodiment, communicating the instructions to implement a long-term noise mitigation strategy includes sending instructions to alter Error-Correcting Code (ECC) parameters based on detecting the impulse noise 221 affecting the DSL line 250. For example, although long-term strategy changes to ECC parameters do not address the real-time detection and mitigation of an impulse noise 221 event, the ECC strategy may nevertheless be improved based on impulse noise observations.

FIG. 2B illustrates an alternative exemplary architecture 201 in accordance with which embodiments may operate. In particular, a first DSL line 250A and a second DSL line 250B are expressly shown, upon which DSL signals 299 are carried by the first DSL line 250A and impulse noise is carried (e.g., detected) via the second DSL line 250B. Additional such lines could further be utilized. According to one embodiment, the first DSL line 250A is an active DSL line carrying DSL signals and the second DSL line is an inactive DSL line upon which no DSL signals are present, with the exception of those associated with interference from neighboring DSL lines, for example, through crosstalk, etc. In one embodiment, either or both lines may be twisted pair telephone lines, for example, having two wires each.

According to a specific embodiment, methods and techniques as described herein are performed by an apparatus for removing interference noise from signals on the DSL line 250A, in which the apparatus includes (e.g., shown at FIG. 2B as an "impulse noise mitigator 220), and further in which the interference canceller is coupled or communicably interfaced with the first DSL line 250A and is further coupled with a second line, the second DSL line 250B as shown here, in which the second line (second DSL line 250B) detects the impulse noise 221 affecting the communications on the first DSL line 250A. For example, impulse noise 221 affecting DSL signals 299 carried by the first DSL line 250A.

According to one embodiment, methods and techniques as described herein are performed by a modem coupled with the first DSL line 250A. For example, the apparatus 170 may be embodied by a modem, such as a CPE modem. In such an embodiment, the modem is further coupled with a second DSL line 250B, and the first and second DSL lines 250A-B each are selected from at least one of an active DSL line or an inactive twisted pair telephone line.

FIG. 2C illustrates an alternative exemplary architecture 202 in accordance with which embodiments may operate. Specifically, an apparatus is depicted as a modem 271 in accordance with at least on embodiment. The figure provides a schematic block diagram having the relevant portions of a DSL modem operating with multiple DSL lines/loops coupled to the modem and implementing one or more methods, systems and/or other embodiments set forth herein.

In one embodiment, the modem 271 is connected with multiple telephone lines or DSL lines, as shown, for example, in the drop or shared segment 260 between pedestal 204 and modem 271. In such a case, one or more wires of the DSL lines connecting the CPE modem 271 to the pedestal 204 may be used as an interference collector, for example, the wires may be utilized to receive and impulse noise for detection or other radio frequency (RF) noise. In the depicted embodiment, modem 271 is connected to pedestal 204 by a multiple loop segment 206 of segment 260 having, in this depicted embodiment, 8 wires 281 through 288, which represent the 8 wires (281, 282, 283, 284, 285, 286, 287, and 288) of 4 loops (291, 292, 293, and 294), resulting in multiple loop segment 206 of shared segment 260.

In the example shown, only loop 294 (using wires 287 and 288) is active, with loops 291, 292, and 293 each being inactive. Thus wires 281 through 286 are not in use for DSL communication purposes, that is, they are not active DSL lines and do not carry a DSL signal. Instead, at least one of these wires, wire 286, is used as an interference collector for modem 271. In this case, wire 286 is practically identical to wires 287 and 288 of active loop 294 (for example, being approximately the same length and having the same orientation, possibly being the same material/type of wire, and possibly having the same amount or absence of shielding) given that it is within the same drop or shared segment 260. This means that wire 286 will receive practically identical RF and/or other interference signals as those received by loop 294. Where more than one source of RF and/or other interference (for example, crosstalk from one or more additional DSL lines) is present, additional inactive loops' wires can be connected with interface 226 and used similarly, if desired.

The interference data collected by via interference collector wire 286 and the incoming data from the active DSL loop 294 is converted from analog to digital form by ADC converters 242 which is communicably interfaced to interface 226. The interference noise data is filtered by filter 241, which bases its conditioning of the interference noise on the output of subtractor 240. The received data from loop 294 can be delayed by delay element 243. The conditioned data from loop 294 and interference collector wire 286 is then input to subtractor 240 so that the interference noise can be removed and the remaining user data passed on to the remaining modem components, modules and/or processing 298. The ADCs 242, filter 241 subtractor 240 depicted represent exemplary circuitry of an impulse noise mitigator 220 in accordance with one embodiment.

In certain embodiments, additional interference collector wires can be brought into service using other wires from inactive loops of the multiple loop segment 206. For example, as shown by the dashed connections 254, wires 283, 284, and 285 can similarly be employed as needed. ADC(s) 242 may then be more than just a single converter and may instead be any suitable conversion circuitry, as will be appreciated by those skilled in the art. Similarly, in such a case, filter 241 may be adaptive filtering circuitry, as will be appreciated by those skilled in the art. Finally, multiple wires in the multiple loop segment 206 can be used to remove interference. Such wires may be referred to as "channels" or "reference channels" or "reference signals," in accordance with the methods and techniques described herein, such as the reference or primary signals 502A and 502B set forth at FIG. 5 and the primary signal 610A and reference signals 610B-610C set forth at FIG. 6. In accordance with one embodiment, any of the wires associated with active 294 or the inactive 291, 292, and 293 loops or lines may be utilized to provide extra twisted pair telephone lines and/or interference collector wires for use in canceling interference in more than one telephone line employed as an active DSL line, for example, where such other active DSL lines are bonded and vectored.

Where a DSL system has available to it additional loops or lines for use as interference collector wires, the RF or other noise and/or interference may be canceled in across all the active DSL lines. In the example depicted here, there are 8 wires in the multiple loop segment 206, only two of which are in use, the two used for loop 294. Thus, according to an exemplary embodiment, the other 6 wires may be used as follows: Interference collector wire 286 for collecting RF interference data, and wires 281-285 (all associated with inactive lines) are then used for collecting interference data for the 5 most significant crosstalkers affecting active loop 294. That is, in a system having N telephone loops or lines available, where one of the telephone loops is the active DSL line, one or more wires in the remaining N−1 loops may be utilized as the interference collector wire or interference collection means to collect interference data. Because there are 2 wires in each loop, there are 2(N−1) wires available for collecting interference data affecting the signals received by modem 271 using the active DSL line. Any suitable interference canceling means can be used in connection with the interference collector wire(s), including more than one type of interference canceling structure where more than one type of interference noise is being removed and/or canceled. Each wire can be used to remove a single source of interference noise or impulse noise (for example, AM radio interference, a household appliance near the segment 260, crosstalk, etc.). Each wire's corresponding interference data can be converted to digital form and be filtered appropriately.

FIG. 3 illustrates an alternative exemplary architecture 300 in accordance with which embodiments may operate. FIG. 3 depicts an embodiment of the impulse noise detector 205 from FIG. 2A in further detail. The output of the impulse noise detector 205 is the start and ending of a detected impulse noise.

In one embodiment, the impulse noise detector 205 is communicably interfaced with a plurality of receivers 311B and 311C, each of the plurality of receivers 311B-C being communicatively interfaced with a distinct one of a corresponding number of reference channels 312B and 312C. As shown, impulse noise detector 205 may further include a receiver 311A to receive primary signal 312A.

In one embodiment, detecting impulse noise includes detecting the impulse noise using one or more reference channels 312B and 312C. In accordance with one embodiment, the one or more reference channels 312B and 312C are selected from among one or more of: (a) a common mode channel on the DSL line 250 communicating via differential mode communication, in which X1 represents the differential mode communication; (b) a common mode channel on a twisted pair telephone line co-located with the DSL line 250 which is not used for DSL communications and represented by X2; (c) a differential of the two common mode channels X1 and X2; (d) a common mode of the two common mode channels X1 and X2; (e) a differential mode channel on a twisted pair telephone line co-located with the DSL line 250 which is not used for DSL communications; (f) a reference signal sourced from an antenna; and (g) a reference signal sourced from one or more power lines.

Reference channels and reference signals 312B and 312C may be taken from any or all of the above sources and are relevant to impulse noise detection as each is capable to pick up relevant noise signatures. As a result of having multiple reference signals 312B and 312C, the impulse noise detector 205 will have improved impulse noise detection capabilities. The DSL line 250 itself is contaminated with the DSL communication signal at high power, and thus, detection of impulse noise 221 events using only the primary signal 312A may be more difficult. However, detection capabilities which leverage multiple reference channels or reference signals 312B and 312C in addition to the primary signal 312A on the DSL line 250 can apply different weights to the different reference signals 312B and 312C and combine them to improve detection and identification of an impulse noise event.

Thus, in accordance with one embodiment, detecting impulse noise 221 includes multi-channel impulse noise detection based on multiple reference channels or multiple reference signals 312B and 312C. Further depicted are single channel analysis blocks 313A, 313B, and 313C for each of the respective primary signal 312A and reference signals 312B and 312C. Each single channel analysis block 313A-C may further indicate a start and end time of a detected impulse noise 221 event. Detection result block 314 then applies the analysis output based on the provided analysis of the single channel analysis blocks 313A-C.

FIG. 4 illustrates an alternative exemplary architecture 400 in accordance with which embodiments may operate. FIG. 4 depicts additional detail of a single channel analysis block, such as the single channel analysis blocks 313A-C depicted at FIG. 3.

As shown, various functional blocks enable the generation and output of statistics 446 for the reference signal or primary signal analyzed. For instance, in one embodiment, processing within the single channel analysis 401 block includes stationary noise suppression 405, power estimation 410, average 415, threshold detection 420, start detection 425, gradient filter 430, peak detector 435, and end detection 440. Impulse statistics collection 445 then generates and outputs statistics 446 including, for example, energy, duration, correlation, and so forth.

Figure 5:
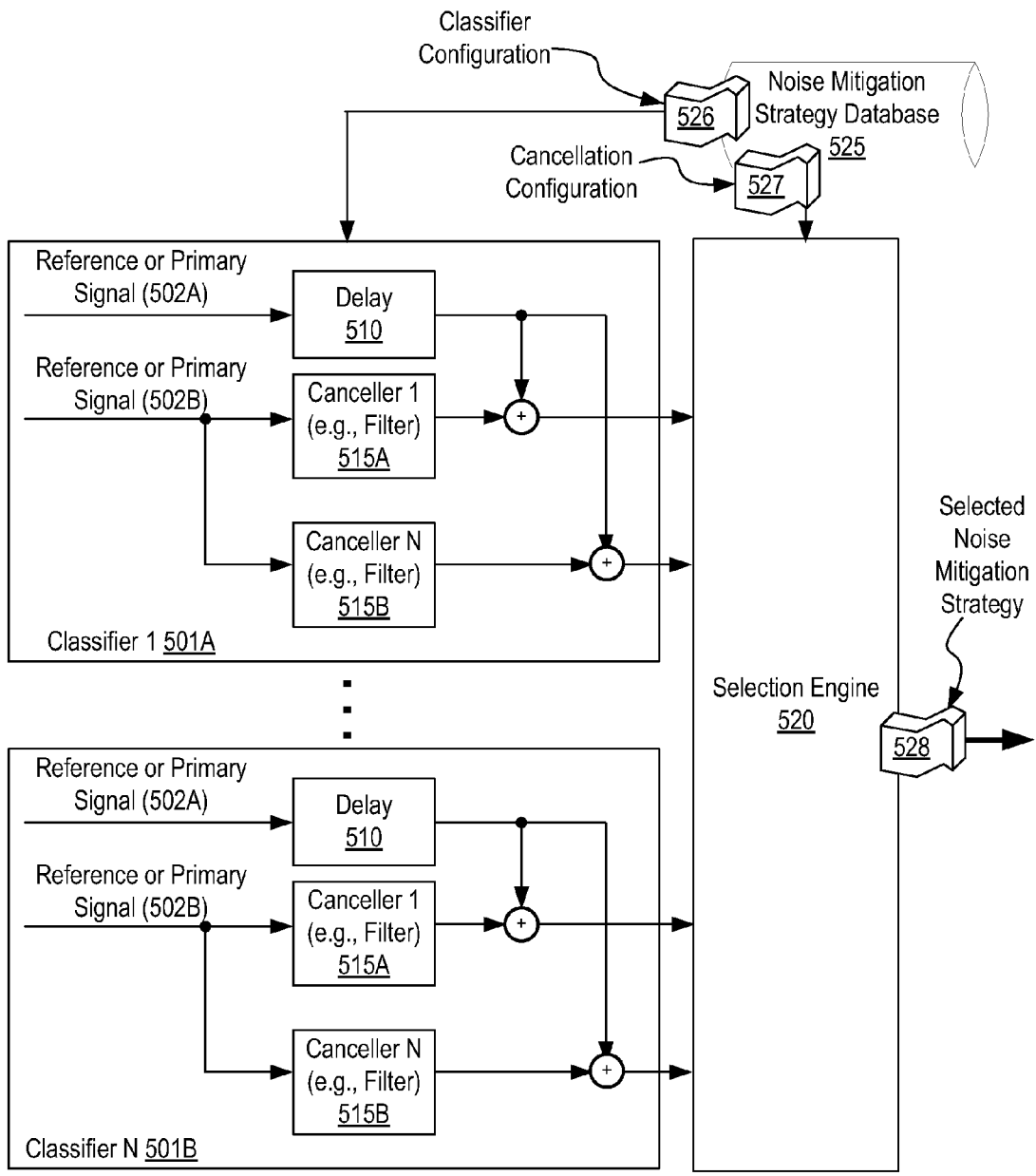
FIG. 5 illustrates an alternative exemplary architecture in accordance with which embodiments may operate.

FIG. 5 illustrates an alternative exemplary architecture 500 in accordance with which embodiments may operate. FIG. 5 depicts how multiple classifiers 210 may operate in concert to provide information to a selection engine 215 which then renders a decision as to which among a plurality of impulse noise mitigation strategies 528 is selected.

In accordance with one embodiment, classifiers 501A and 501B are utilized, in which each of the classifiers 501A and 501B includes a delay 510 block and canceller (e.g., a filter) 1 515A through canceller N 515B capable to evaluate reference signals or primary signals 502A and 502B as input.

The noise mitigation strategy database 525 stores a plurality of impulse noise mitigation strategies and also provides classifier configurations 526 to each of the classifiers 501A-B. Selection engine 520 renders a decision as to which of a plurality of noise mitigation strategies to choose based on input from the classifiers 501A and 501B and based further on cancellation configuration 527 from the noise mitigation strategy database 525. In another embodiment, rather than utilizing cancellation configuration 527, selection engine 520 may utilize a noise database (e.g., 705A-C as set forth at FIG. 7) which contains information on noise statistics including previous cancellation results. For instance, one example may be the use of periodicity information available from the database to predict when the next impulse will hit and then implement preemptive cancellation.

The selection engine 520 then outputs the selected noise mitigation strategy 528. In accordance with one embodiment, the apparatus 170 retrieves the plurality of noise mitigation strategies from the noise mitigation strategy database 525 operating as a remote database.

Classification may be based upon cancellation, however, other features or techniques may be utilized such as covariance. For example, using cancellation, noise may be canceled in one of the reference signals 502A-B using noise taken from another reference signal 502A-B. Cancellation may also be implemented using a predictive configuration. With predictive configuration, the signal in 502A and 502B are identical. Therefore, the canceller filter (515A-515B) become a linear prediction filter. Unlike other configurations, this predictive configuration can test only the autocorrelation of the impulse noise in a particular channel.

In one embodiment, a classification filter is applied one of the signals (either a primary signal or a reference signal) and then the filtered output is subtracted from another signal (either a primary signal or a reference signal). Based on the subtraction, an energy reduction is calculated to determine effectiveness or to grade and rank the relative effectiveness where multiple filters and reference channels are utilized.

In another embodiment, each of a plurality of classification filters represents an impulse class. However, in some embodiments there may be more than one classification filter per impulse class. For example, one classification filter may be used to test-cancel the impulse in common mode by using differential mode such that that input to the classification filter is differential mode and the output is applied to common mode. Another classification filter may then be used to test-cancel the impulse in powerline by using common mode. The test-cancellation results may then be merged, and then classification of the impulse noise event will based on the merged result.

The classifiers 501A-B may apply different solutions, such as multiple short classification filters associated with different available classes, thus producing a variety of results which may later be subject to validation, grading, and ranking. For example, different solutions may be applied to the available reference channels and then the results may be checked to determine whether or not a particular classification filter is successful and additionally be graded and ranked so as to determine which of multiple successful classification filters works best. Multiplexer 235 may then be controlled to select the best output.

One means for determining success is to measure the energy output of an output signal. For example, if the energy output of the output signal is less than a corresponding input, then cancellation may have provided some beneficial cancellation on the applicable reference line which could also benefit the primary signal communications on the DSL line. Although the DSL communication channel of the DSL line may itself be evaluated, it is often beneficial to use at least one or more reference channels to perform the classification operation as the reference channels will not be saturated with high energy DSL signals carrying payload data.

Evaluation of the active DSL line is nevertheless feasible, for example, by evaluating a common mode of the DSL line given that the DSL line communicates via differential mode. Thus, where as the DSL communication channel may exhibit a high level of total energy, the common mode on the same physical DSL line may exhibit a significantly lower level of total energy, and is therefore a feasible source detecting and classifying impulse noise.

In one embodiment, one of classifiers 501A-B determines that a cold-start condition exists and the selection engine 520 responsively identifies a cold-start default class specifying a default filter calculation as the noise mitigation strategy to apply a default filter calculation.

Upon identification of a cold-start condition, noise mitigation strategy may not be available, and thus, the original signal may simply be allowed to pass through or be selected at the MUX, despite the existence of the impulse noise event on the DSL communication signal. Statistics associated with the unknown type of impulse noise event may be gathered and the actual waveform itself may be captured, and then such data is provided to an entity with more resources to work on the problem and update the noise mitigation strategies appropriately. For example, such information may be communicated to a remote server which provides such a service or collected and stored locally by a signal conditional device which implements such a function. Although the immediately encountered impulse noise is not mitigated, over time the collection of such data will nevertheless improve service overall.

Because more than one reference signal may be utilized at the same time, more than one cancellation filter may also be actively used, thus establishing a multi-reference structure in the hardware.

Thus, in accordance with one embodiment, classifying the detected impulse noise includes: (a) applying distinct classification filters to one of a plurality of reference channels, in which each of the distinct classification filters correspond to a different class; (b) grading effectiveness (e.g., via a validator) of each of the distinct classification filters based on a decrease of energy output from each of the plurality of reference channels; and (c) ranking the distinct classification filters based on the grading to establish a classification for the detected impulse noise.

Figure 6:
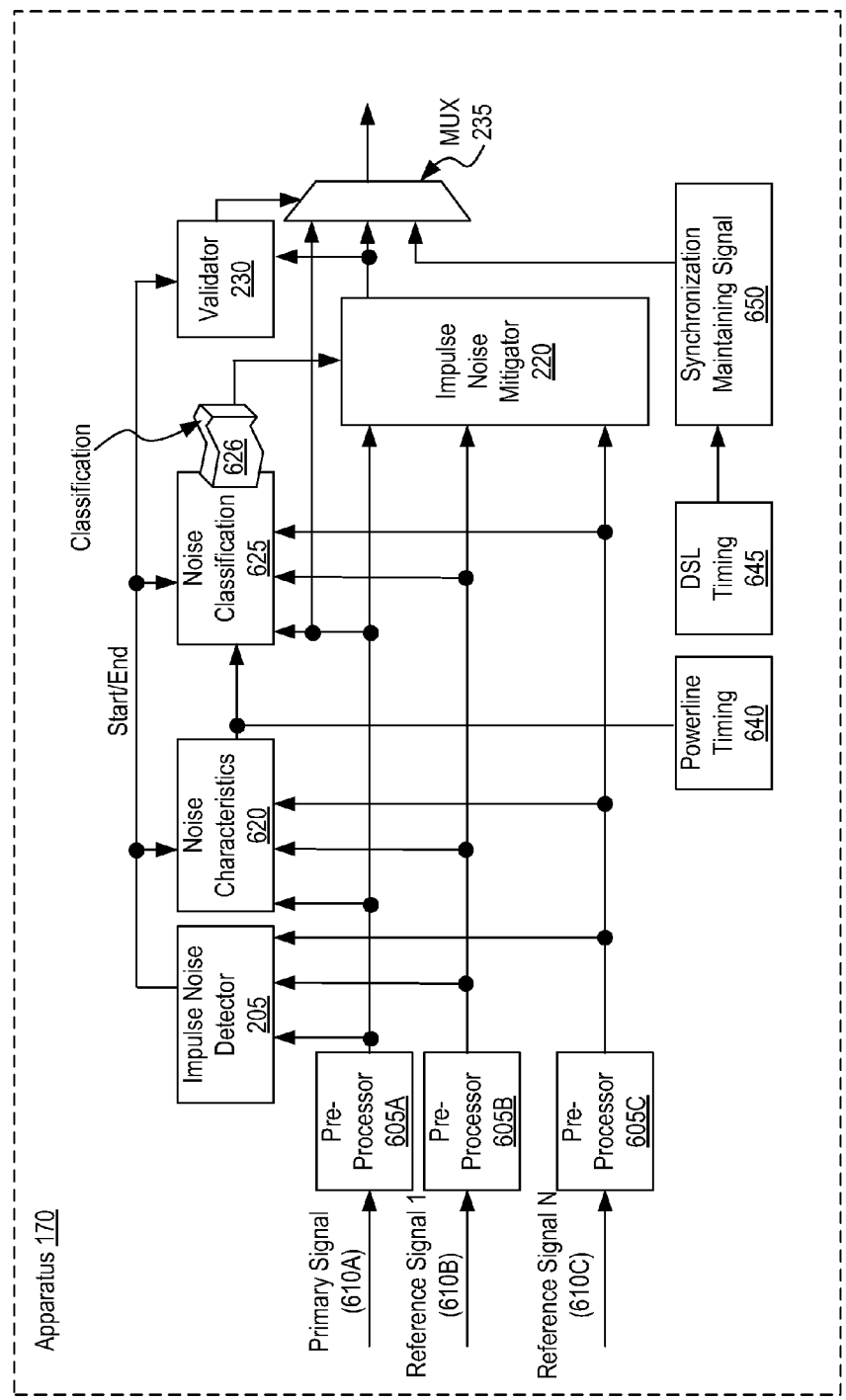
FIG. 6 illustrates an alternative exemplary architecture in accordance with which embodiments may operate.

FIG. 6 illustrates an alternative exemplary architecture 600 in accordance with which embodiments may operate. FIG. 6 depicts how pre-processing may be applied to an incoming primary signal and reference signals. Here an apparatus 170 is depicted as having multiple pre-processors 605A, 605B, and 605C, to apply pre-processing to primary signal 610A and reference signals 610B and 610C.

The multiple pre-processors 605A-C provide pre-processed variants of the primary and reference signals 610A-C to other functional blocks as shown within the depicted embodiment of apparatus 170, including impulse noise detector 205, noise characteristics 620, noise classification 625, and impulse noise mitigator 220. Noise classification 625 provides a classification 626 of the impulse noise 221 to the impulse noise mitigator 220 which performs cancellation utilizing the plurality of noise mitigation strategies 223 as described previously. Validator 230 and MUX 235 are additionally shown. Validator 230 controls the MUX 235 such that when validator 230 positively validates the impulse cancellation, the MUX 235 output will be the output of impulse noise mitigator 220. Otherwise, where validator 230 does not positively validate the impulse cancellation, then validator 230 will cause MUX 235 to output primary signal 605A.

In accordance with one embodiment, a pre-processor 605A-C of the apparatus pre-processes a signal 610A-C before the impulse noise detector 205 evaluates the DSL line 250 to detect the impulse noise 221. In such an embodiment, pre-processing is based on prior knowledge of an operational environment associated with the DSL line 250 when the operational environment is free of impulse noises. Pre-processing may provide narrowband noise cancellation of stationary noise prior to application of the selected noise mitigation strategy 223.

Pre-processing based on the environment may include information such as which AM signals affect DSL communications for the DSL line 250. Pre-processing removes the stationary and persistent noise component before processing is directed toward cancellation of the impulse noise 221 coefficient. For example, pre-processing may be appropriate for persistent AM signals which are stationary signals rather than impulse type non-stationary signals because the AM signal waveforms are identifiable and may therefore be subtracted out.

In one embodiment, the pre-processing is only applied to a re-generated output signal which is limited to looking for only sinusoid signals.

Filters can be selected which make it easier to detect the impulse noise 221 events. However, applying filtering to the primary signal 610A on the DSL line 250 may cause problems where it becomes necessary to undo the filtering to keep the DSL signal integrity. Thus, an original or non-filtered signal or copy of the primary signal 610A may be maintained. Alternatively, the change in spectrum induced from filtering may be whitened to reverse the filtering effects. In one embodiment, both narrowband noise cancellation and filtering are applied before the impulse noise detector 205 evaluates for an impulse noise 221 event but only a narrowband noise cancellation is applied to a signal prior to the impulse noise mitigator 220 which applies the selected noise mitigation strategy.

Thus, in accordance with one embodiment, the classifier classifies the detected impulses based on pre-processed signals. In another embodiment, the classifier includes, or is interfaced with, a plurality of receivers communicatively interfaced to a corresponding number of reference channels.

Additionally depicted is the powerline timing 640 block. Conventional DSL components avoid additional receivers, such as receivers on the common mode, because the additional circuitry is more costly to implement. However, efforts to mitigate impulse noise events may be aided by the receipt and evaluation of reference signals 610B-C from sources that are distinct from the DSL communication signal (primary signal 610A) which is saturated with payload information transmitted at high powers. Therefore, alternate sources (reference signals 610B-C) can prove beneficial despite the issue of additional cost and complexity.

Such alternative sources may include, for example, a common mode signal on the same DSL line or differential and common mode signals from different lines including a telephone line which is not used for DSL communication, as well as power lines, antennas, etc. An apparatus conducting impulse noise mitigation can therefore be communicatively interfaced to such reference channel sources so as to receive and evaluate them as part of the impulse noise detection and mitigation operations. In another embodiment, a powerline signal near the DSL line 250 may be used to provide information about the impulse noises, such a signal may be provided by powerline timing block 640. Especially when there is powerline based LAN (Local Area Network), the powerline LAN may create impulsive noises to DSL line 250. Using a powerline signal from powerline timing block 640, the impulsive noises originating from the powerline LAN and be systematically cancelled. Further still, using the powerline signal from powerline timing block 640, impulse noises may be classified based on whether a given impulse noise 221 event is attributable to the powerline LAN or to another source, which thus simplifies the classification and clustering operations. In detecting impulse noise 221 events, whether attributable to powerline communications or otherwise, information from the powerline communications, such as packet header information, may be captured and used in the impulse noise classification functions.

Further depicted is DSL timing 645 block and synchronization maintaining signal 650 which is inputted to the MUX 235. Such information may be utilized where an uncorrectable impulse noise event is detected. The injected synchronization signal may be a convolution of the estimated channel and a so called synchronization symbol (for example, as defined in Section 7.11.3 of the G.992.1 standard), the injection enabling a properly maintained super-frame synchronization and symbol synchronization. In accordance with one embodiment, classifying the detected impulse noise into one of a plurality of impulse noise classes includes: (a) determining that an un-correctable impulse noise event has been detected; (b) identifying a DSL signal synchronization class specifying a replacement of the communications on the DSL line with a DSL synchronization signal as the noise mitigation strategy; and (c) replacing the communications on the DSL line with the DSL synchronization signal for a time duration corresponding to the detected impulse noise. For example, the start/end indicators may be used to determine a duration for which the replacement signal based on the DSL timing 645 block and synchronization maintaining signal 650 should be used.

Sometimes an impulse noise event is sufficiently severe that without the DSL synchronization maintaining signal 650, the impulse noise 221 event will knock a DSL modem offline consequently requiring the DSL modem to re-train. Depending on the particular DSL modem, retraining can take between 30 seconds up to several minutes, during which time communication of payload data is unavailable. A DSL subscriber or customer may therefore observe that Internet access has been lost, which may result in customer dissatisfaction and may additionally cause the customer to engage technical support leading to increased costs for a DSL operator. Although the DSL modem will eventually return to normal service on its own through the re-training operation, such events undermine a customer's perception of the quality of service provided by the DSL operator. When an impulse noise event is sufficiently severe to knock a DSL modem offline, it may also be of such severity that it cannot be adequately corrected, especially where it is of an unknown type lacking a good classification match. Thus, one noise mitigation strategy for such an impulse noise event is to drop the DSL communication signal carrying the impulse such that it cannot reach the DSL modem. However, terminating all communications may also trigger a re-training event due to a total loss of synchronization information. Therefore, the synchronization maintaining signal 650 operates as a replacement signal which is void of payload data but which carries re-generated or synthesized DSL synchronization data which is then selected at MUX 235 and transmitted onto the DSL line 250 to keep the DSL modem alive for the duration of the impulse noise which is dropped. The trade-off is therefore accepting a definite loss of payload data in exchange for negating a potential DSL modem retrain event. Higher level protocols will then coordinate the retransmission of the missing data.

In accordance with one embodiment, the validator 230 determines that an un-correctable impulse noise event has been detected and the validator 230 further identifies a DSL signal synchronization class specifying a replacement of the communications on the DSL line with a DSL synchronization signal as the noise mitigation strategy. In such an embodiment, the DSL timing 645 module provides the DSL synchronization signal as the noise mitigation strategy to the MUX 235 which responsively releases the DSL synchronization maintaining signal 650 onto the DSL line 250.

In one embodiment, the impulse noise mitigator 220 applies the noise mitigation strategy to the communications on the DSL line 250. In one embodiment, the noise mitigation strategy is applied to one of a plurality of copies of the communications on the DSL line 250 and the MUX 235 selects and releases an un-modified copy of the communications (e.g., primary signal 610A in an unmodified form) onto the DSL line 250 at the MUX when the corrected signal 224 is negatively validated.

Validator 230 may further coordinate grading and ranking operations also referred to as scorecarding. For instance, where multiple cancellation strategies are attempted by the apparatus 170 or multiple various filters are applied to signals accessible to the apparatus 170, each of the plurality of noise mitigation strategy results or filter output may be later evaluated to determine what resulting output should be released from the MUX 235.

Scorecarding at validator 230 may determine that all noise mitigation strategies attempted are either not correct or not sufficient. Thus, one embodiment, applying the noise mitigation strategy to the communications on the DSL line includes applying the noise mitigation strategy to one of a plurality of copies of the communications on the DSL line and then selecting and releasing an un-modified copy (e.g., releasing primary signal 610A) of the communications on the DSL line at the MUX when the corrected signal is negatively validated or is graded and ranked lesser than the un-modified copy of the communications on the DSL line.

In accordance with one embodiment, validator 230 updates a cancellation coefficient for the corrected signal when validation is successful and updates the selected noise mitigation strategy with the calculated cancellation coefficient.

In accordance with one embodiment, the validator 230 determines validity and a grade or rank for an attempted noise mitigation strategy based on at least one of the following criteria: (a) validating a corrected signal when a decrease of total energy is exhibited; (b) validating the corrected signal when a decrease of energy in excess of a threshold is exhibited; and (c) validating the corrected signal from among a plurality of corrected signals based on the corrected signal having a greatest energy within a specified frequency band corresponding to transmission of the communications on the DSL line.

The apparatus may be embodied in various forms. For example, apparatus 170 may be implemented via one of: (a) a chipset of a Customer Premises Equipment (CPE) modem communicably interfaced with a first end of the DSL line; (b) a chipset of a signal conditioning device physically separate and distinct from a Customer Premises Equipment (CPE) modem, in which the CPE modem is communicably interfaced with the first end of the DSL line and in which the signal conditioning device is communicatively interfaced to the CPE modem; (c) a controller card configured within a Customer Premises Equipment (CPE) modem communicably interfaced with the first end of the DSL line; and (d) a controller card configured within a signal conditioning device physically separate and distinct from a Customer Premises Equipment (CPE) modem in which the CPE modem is communicably interfaced with the first end of the DSL line and further in which the signal conditioning device is communicatively interfaced to the CPE modem.

In another embodiment, detecting the impulse noise includes detecting the impulse noise at a Customer Premises Equipment (CPE) modem communicably interfaced with a first end of the DSL line and selecting the noise mitigation strategy from among a plurality of noise mitigation strategies includes receiving the plurality of noise mitigation strategies from a database at a service provider physically separate and distinct from the CPE modem. In one embodiment, the service provider computes the plurality of noise mitigation strategies on behalf of the CPE modem. In one embodiment, the database at the service provider is accessible based on a paid service subscription. In one embodiment, apparatus 170 is enabled to verify that it is located between a DSLAM and a CPE modem (or the modem circuitry of a CPE modem having the apparatus 170 embodied therein). For example, if the apparatus 170 is not properly networked it will make a determination of such a faulty installation and provide an appropriate indication.

In another embodiment, the method is implemented via a signal conditioning device physically separate and distinct from a Customer Premises Equipment (CPE) modem, in which the signal conditioning device is communicably interfaced with a first end of the DSL line and in which the CPE modem is communicatively interfaced to the signal conditioning device. In such an embodiment, the signal conditioning device iteratively computes and updates the stored noise mitigation strategies when excess computational resources are available. Such a signal conditioning device may be co-located at a customer premises with the CPE modem. In one embodiment, such a signal conditioning device includes: (a) a clustering engine to pre-compute the plurality of noise mitigation strategies when excess computational resources are available within the signal conditioning device, (b) store the plurality of noise mitigation strategies within a database of the signal conditioning device, (c) provide the plurality of noise mitigation strategies to the selection engine, and (d) enable the signal conditioning device to test for faulty installation scenarios to ensure proper functionality by utilizing hardware to transmit/receive probing signals and couple them with the DSL line side and modem side of the signal conditioning device.

In one embodiment, the clustering engine operates physically remote from the apparatus and is operated by a third party distinct from a subscriber of the DSL line and distinct from an operator of the DSL line.

Figure 7:
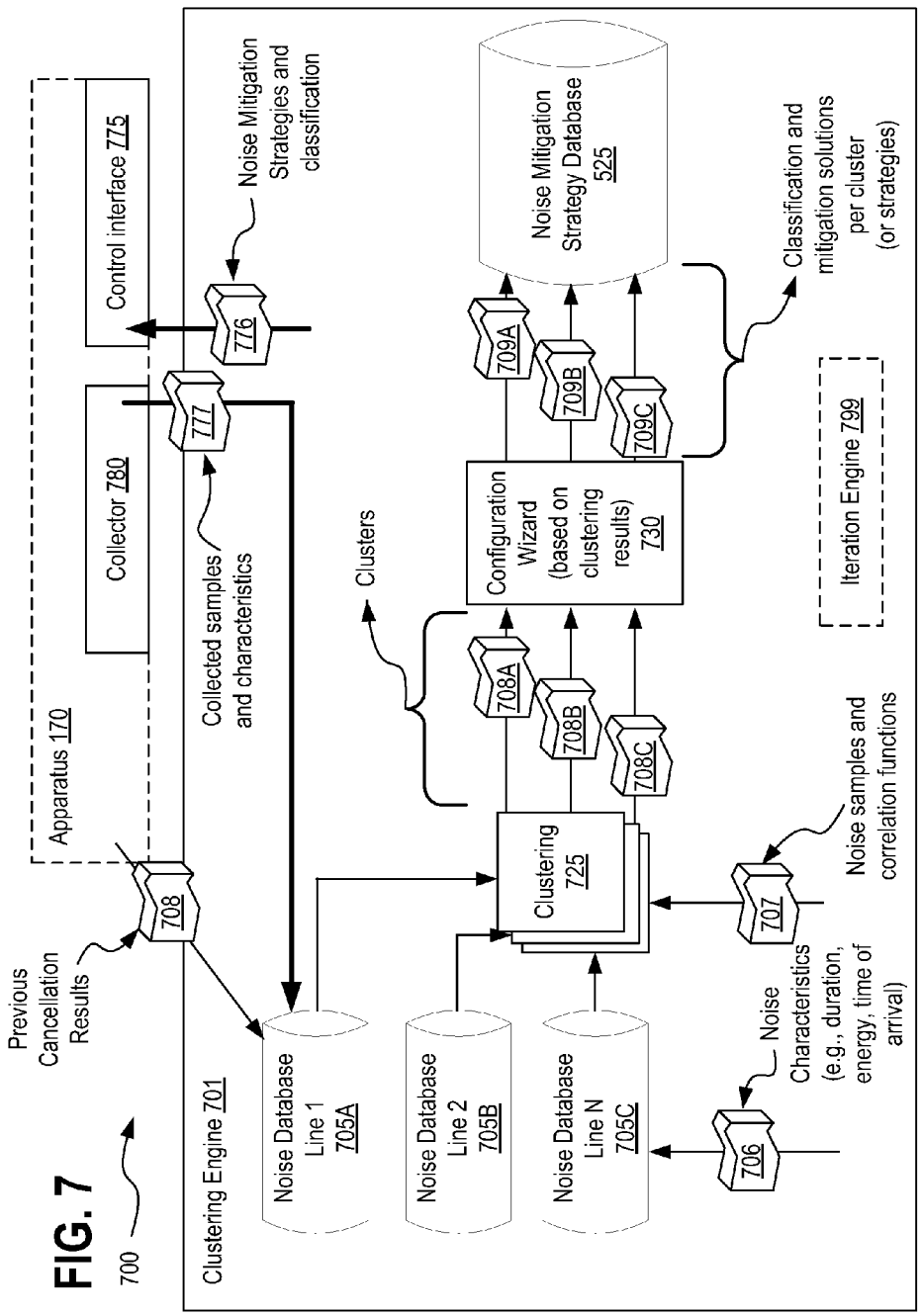
FIG. 7 illustrates an alternative exemplary architecture in accordance with which embodiments may operate.

FIG. 7 illustrates an alternative exemplary architecture 700 in accordance with which embodiments may operate. FIG. 7 depicts a clustering engine 701 in further detail. For instance, a noise mitigation strategy may be available for each of the depicted lines. Given N lines, a corresponding N sets of strategies will be available where each of the N sets contains multiple strategies to be used for a particular one of the N lines.

Depicted within clustering engine 701 are noise databases including noise database line 1 705A and noise database line 2 705B through noise database line N 705C, each having noise characteristics 706 (e.g., duration, energy, time of arrival, etc.) as input and further having noise samples and correlation functions 707 as input. Previous cancellation results 708 may also be input into the noise databases 705A-C, for example, available from apparatus 170 or from other sources, such as a monitoring entity.

Previously received and stored impulse noise events from the noise databases 705A-C are provided to the clustering 725 blocks which cluster the plurality of impulse noise events into groups resulting in clusters 708A, 708B, and 708C, respectively, representative of the impulse noise events provided by the noise databases 705A-C. Multiple clusters per line may be utilized. Moreover, clustering may be computed for every line which results in different clustering strategies for the different lines. Configuration Wizard (based on clustering results) 730 applies various cancellation strategies against the clusters 708A-C resulting in the classification and mitigation solutions per cluster (or strategies) 709A-C which are then provided to and stored within the noise mitigation strategy as stored impulse noise mitigation strategies. The intermediate block 730 allows for only a subset of impulses noises to be used to compute the actual impulse noise cancellation filter coefficients. For example, the impulse noises that re collected during so-called DSL sync symbol period may be used for computing the cancellation filter coefficients.

In accordance with one embodiment, the clustering engine 701: (a) receives information about a plurality of observed impulse noise events (multi-channel samples, multi-channel correlation functions and event characteristics) extracted from each of at an apparatus 170; (b) clusters previously observed impulse noise events into groups (e.g., groups in which group members benefit from sharing the same impulse noise mitigation solution 708A-C) based at least in part on the information extracted from each of the observed impulse noises and received by the clustering engine 701; (c) computes a plurality of noise mitigation strategies from the clustered impulse events using information supplied about the these impulse noise events for classification and mitigation; (d) provides a plurality of impulse noise mitigation strategies as impulse classification strategies to a selection engine 215 of the apparatus 170 for classification, and (e) provides a plurality of impulse noise mitigation strategies as impulse mitigation strategies to cancel impulse contributions on the DSL line 250. In accordance with one embodiment, the apparatus 170 includes a control interface 775 (such as interface 226 depicted at FIG. 2) to communicate characteristics extracted from each of the observed impulse noises to a clustering engine remote from the apparatus.

The clustering engine and its depicted database may be remote from the apparatus 170. Thus, in one embodiment, the clustering engine provides the plurality of noise mitigation strategies and classification 776 to the selection engine of the apparatus by storing the plurality of noise mitigation strategies into a database 525 remote from the apparatus and by sending the plurality of noise mitigation strategies to the control interface 775 of the apparatus 170 from the database 525. In an alternative embodiment, the clustering engine 701 and the database 525 are local to the apparatus 170 or embodied within the apparatus 170.

In one embodiment, the apparatus further includes a collector 780 to collect new samples 777 of impulse noises. Such samples may be input into the noise databases 705A-C. In one embodiment, the control interface 775 uploads the new samples 777 of impulse noises to the clustering engine. In one embodiment, the clustering engine 701 updates the plurality of noise mitigation strategies and classification 776 stored in the database based on the new samples 777 of impulse noises uploaded to the clustering engine 701.

In one embodiment, the classifier of the apparatus 170 determines that an unknown type of impulse noise event has been detected and the collector 780 captures and sends a waveform of the unknown type of impulse noise event to the clustering engine via the control interface 775.

Because impulse noise samples may be collected and uploaded to the clustering engine, the noise mitigation strategies may be improved and customized to a particular operational environment over time, and thus, in accordance with one embodiment, the plurality of noise mitigation strategies stored within database 525 change over time as do the plurality of noise mitigation strategies held by the selection engine 215. Similarly, the plurality of noise mitigation strategies when stored within a client device, such as apparatus 170 of FIG. 1, change over time, whether integrated with a CPE modem, terminal equipment, etc. Furthermore, noise mitigation strategies may be improved in real-time per impulse occurrence by iterative methods. These range from improving all of the noise mitigation strategies by iterations and then selecting the best, or selecting the best strategy and performing iterations on one strategy only. The ability to perform iteration based improvements is dictated by the constraints of the platform and how to perform iterations depends on how close the strategy results are relative to each other. In accordance with one embodiment, the iteration engine 799 implements iterative techniques on behalf of a clustering engine to perform iterative improvement over time to the noise mitigation strategies.

Because impulse noise samples may be collected and uploaded to the clustering engine, the noise mitigation strategies may be improved and customized to a particular operational environment over time, and thus, in accordance with one embodiment, the plurality of noise mitigation strategies stored within database 525 change over time as do the plurality of noise mitigation strategies held by the selection engine 215.

Clustering involves the grouping of many impulse noise events in which the greater the population the better a strategy may be derived, but additionally, the greater the population the more complex the problem of clustering becomes. For example, given thousands of observed impulse noise events, conventional techniques would require the calculation and determination of a corresponding number distinct cancellation schemes resulting in thousands of distinct cancellation schemes and an immense computational burden. However, it is not computationally feasible to calculate such noise mitigation strategies in real-time. Therefore, means are provided to extract characteristics from each of the exemplary thousands of impulse noise events (e.g., via collected samples and characteristics 777 as previously observed and collected over time by apparatus 170) and to then group them into clusters 708A-C representing clusters of impulses. Each cluster then has a corresponding strategy for cancellation for the given class or group of clustered impulse noises. In some embodiments, the clusters may be pre-computed for the group of clustered impulse noises, however, this is not necessarily required For example, multiple power line events may be observed as impulse noise events at, for example, 60 hertz, but such events may not necessarily be related or be appropriate for a common impulse noise mitigation strategy. Moreover, each of the available reference channels or sources of reference signals may exhibit different characteristics, even for a common impulse noise event. Thus, clustering allows for an initialization process by which samples may be collected, grouped, and mitigation strategies can be computed or pre-computed as needed. Subsequent samples collected over time may then be utilized to update and improve the initially derived mitigation strategies. Powerline timing may represent one cluster or multiple clusters. Impulse noise events tend to occur at a particular time in the power line signal, such as at the crest of a 60 hertz signal. Accordingly, periodicity based strategies may be employed to detect and correct impulse noises which occur at with determinable periodicity. For example, by knowing the timing of the peaks, the occurrence of impulses may be predicted. Thus, when a vacuum cleaner or a refrigerator's compressor turns on and draws current, repetitive but predictable impulses may occur for 5 or 10 minutes, but the timing and characteristics of the respective impulse noise events can nevertheless be predicted based on the power line cycle, and thus may correspond to an exemplary classification. Other power line clusters may be specified to capture different representative characteristics of impulse noise events, as may other clusters which are unrelated to powerline type events.

Subsequently, when a new impulse noise is detected during operation of the DSL line, rather than attempting to compute a mitigation strategy in real-time, the detected impulse noise is classified so that it falls into one of the available groups, and the corresponding impulse noise mitigation strategy is selected for use in canceling or otherwise handling the detected impulse noise affecting the DSL line. Clustering therefore reduces the computational burden on the apparatus 170 such that it is feasible to perform real-time detection and impulse noise mitigation on an actively operating DSL line. Elastic clusters may be implemented such that it is possible to efficiently split clusters, merge clusters depending on resources available and performance needs.

Thus, in accordance with one embodiment, computing the plurality of noise mitigation strategies includes: (a) computing multiple noise mitigation strategies for each of the groups of previously observed impulse noises and based further on performance of previously attempted mitigation attempts; (b) comparing each of the multiple noise mitigation strategies for each of the groups; and (c) assigning one of the multiple noise mitigation strategies for each of the groups as the noise mitigation strategy for the respective group.

Figure 8:
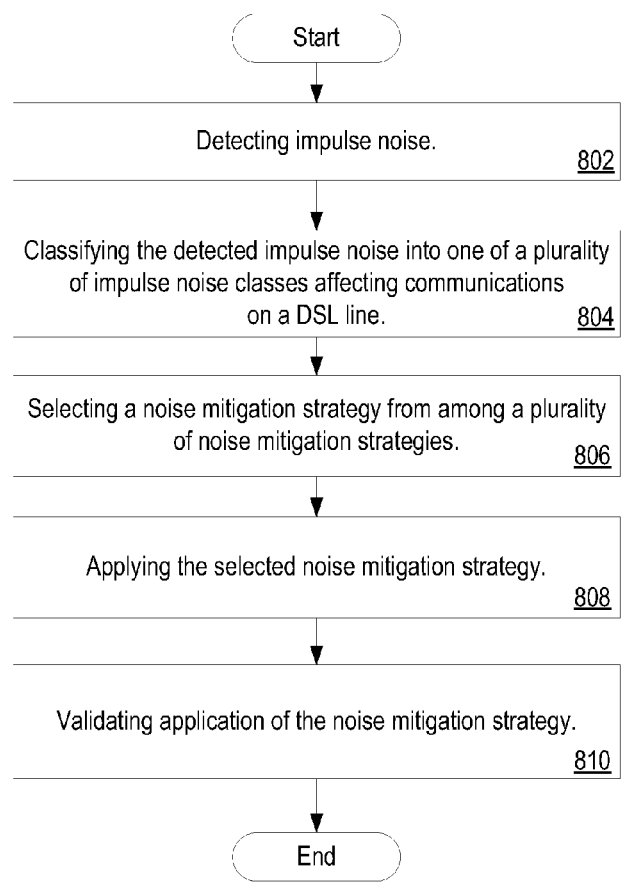
FIGS. 8 and 9 are flow diagrams illustrating methods for impulse noise detection and mitigation in accordance with described embodiments.
Figure 9:
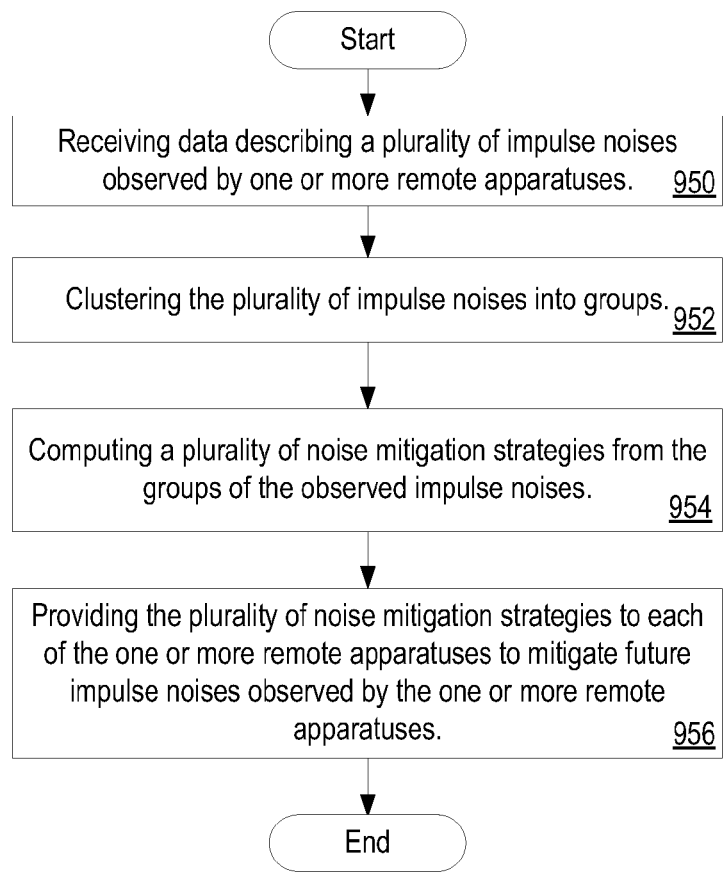

FIGS. 8 and 9 are flow diagrams 800 and 900 respectively, illustrating methods for impulse noise detection and mitigation in accordance with described embodiments. Methods 800 and/or 900 may be performed by processing logic that may include hardware (e.g., circuitry, dedicated logic, programmable logic, microcode, etc.), software (e.g., instructions run on a processing device to perform various operations such as interfacing, collecting, generating, receiving, monitoring, diagnosing, analyzing, classifying, validating, or some combination thereof). In one embodiment, methods 800 and 900 are performed or coordinated via an apparatus such as that depicted at element 170 of FIG. 1 and described throughout. In another embodiment, the method operations are performed or coordinated by an entity separate from apparatus, such as a clustering engine 701. Some of the blocks and/or operations listed below are optional in accordance with certain embodiments. The numbering of the blocks presented is for the sake of clarity and is not intended to prescribe an order of operations in which the various blocks must occur. Additionally, operations from the various flows 800 and 900 may be utilized in a variety of combinations, including in combination with each other.

Method 800 begins with processing logic for detecting impulse noise at block 802.

At block 804, processing logic classifies the detected impulse noise into one of a plurality of impulse noise classes affecting communications on a DSL line.

At block 806, processing logic selects a noise mitigation strategy from among a plurality of noise mitigation strategies.

At block 808, processing logic applies the selected noise mitigation strategy.

At block 810, processing logic validates application of the noise mitigation strategy.

In accordance with one embodiment, there is a non-transitory computer readable storage medium having instructions stored thereon that, when executed by a processor of an apparatus, the instructions cause the apparatus to perform operations comprising: detecting impulse noise affecting communications on a Digital Subscriber Line (DSL line); classifying the detected impulse noise into one of a plurality of impulse noise classes; selecting a noise mitigation strategy from among a plurality of noise mitigation strategies; applying the selected noise mitigation strategy; and validating application of the noise mitigation strategy.

Method 900 begins with processing logic for receiving data describing a plurality of impulse noises observed by one or more remote apparatuses as set forth at block 950.

At block 952, processing logic clusters the plurality of impulse noises into groups.

At block 954, processing logic computes a plurality of noise mitigation strategies from the groups of the observed impulse noises.

At block 956, processing logic provides the plurality of noise mitigation strategies to each of the one or more remote apparatuses to mitigate future impulse noises observed by the one or more remote apparatuses In accordance with one embodiment, there is a non-transitory computer readable storage medium having instructions stored thereon that, when executed by a processor of an apparatus, the instructions cause the apparatus to perform operations comprising: receiving data describing a plurality of impulse noises observed by one or more remote apparatuses; clustering the plurality of impulse noises into groups; computing a plurality of noise mitigation strategies from the groups of the observed impulse noises; and providing the plurality of noise mitigation strategies to each of the one or more remote apparatuses to mitigate future impulse noises observed by the one or more remote apparatuses.

Figure 10:
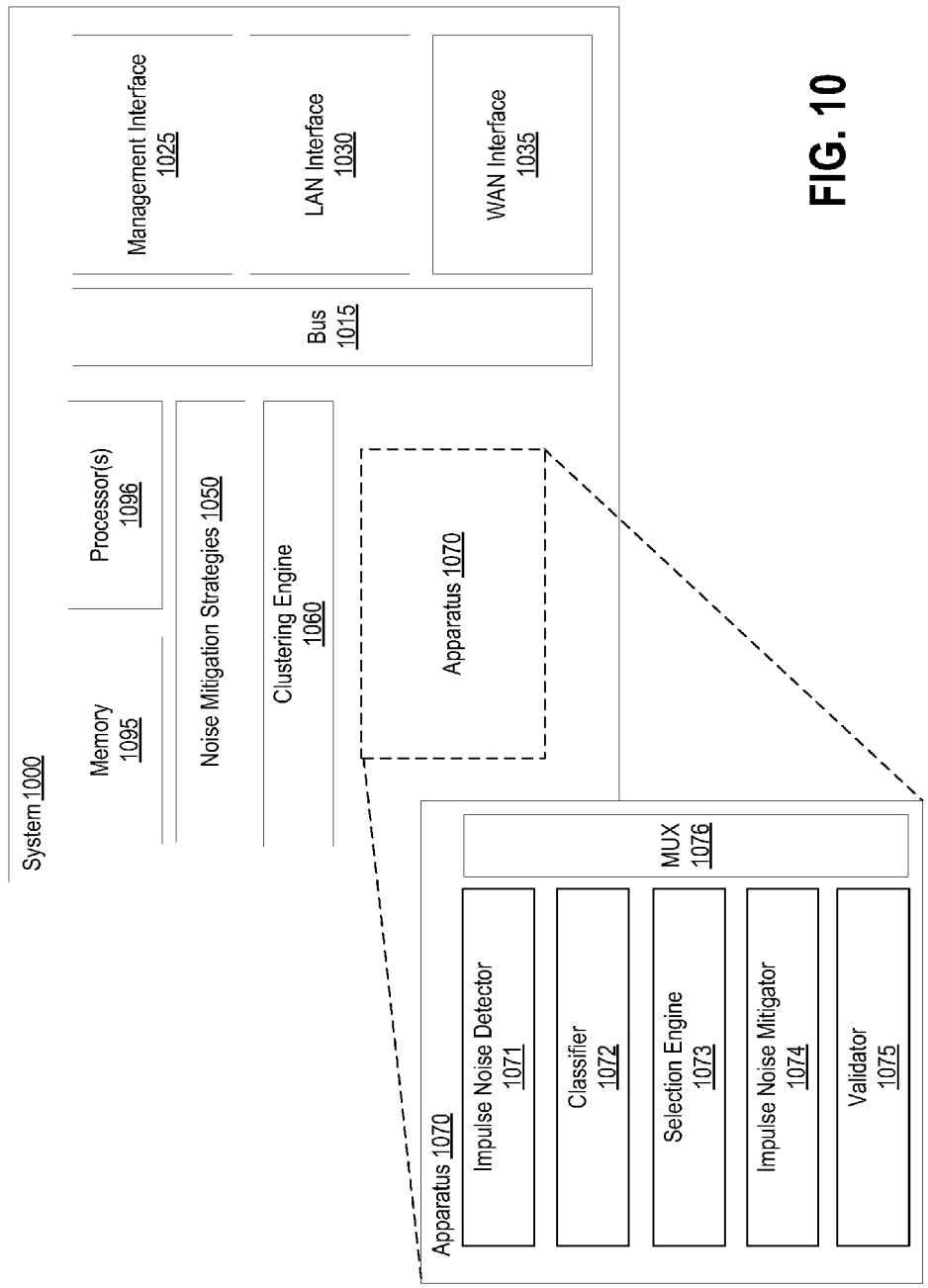
FIG. 10 shows a diagrammatic representation of a system in accordance with which embodiments may operate, be installed, integrated, or configured.

FIG. 10 shows a diagrammatic representation of a system 1000 in accordance with which embodiments may operate, be installed, integrated, or configured.

In one embodiment, system 1000 includes a memory 1095 and a processor or processors 1096. For example, memory 1095 may store instructions to be executed and processor(s) 1096 may execute such instructions. Processor(s) 1096 may also implement or execute implementing logic capable to implement the methodologies discussed herein. System 1000 includes communication bus(es) 1015 to transfer transactions, instructions, requests, and data within system 1000 among a plurality of peripheral devices communicably interfaced with one or more communication buses 1015. System 1000 further includes management interface 1025, for example, to receive requests, return responses, and otherwise interface with network elements located separately from system 1000.

In some embodiments, management interface 1025 communicates information via an in-band or an out-of-band connection separate from LAN and/or WAN based communications. The "in-band" communications are communications that traverse the same communication means as payload data (e.g., content) being exchanged between networked devices and the "out-of-band" communications are communications that traverse an isolated communication means, separate from the mechanism for communicating the payload data. An out-of-band connection may serve as a redundant or backup interface over which to communicate control data and instructions between the system 1000 other networked devices or between the system 1000 and a third party service provider. System 1000 includes LAN interface 1030 and WAN interface 1035 to communicate information via LAN and WAN based connections respectively. System 1000 includes clustering engine 1060 to receive impulse noise samples or characteristics and cluster the impulse noise samples into groups representative of impulse noises and then compute a plurality of noise mitigation strategies 1050 to be stored and then provided to apparatus 1070. Historical information may also be stored and analyzed or referenced when conducting long term analysis and reporting.

Distinct within system 1000 is apparatus 1070 which includes impulse noise detector 1071, classifier 1072, selection engine 1073, impulse noise mitigator 1074, validator 1075, and MUX 1076. Apparatus 1070 may be installed and configured in a compatible system 1000 as is depicted by FIG. 10, or embodied in various forms such as a controller, chip set, CPE modem, signal conditioning device, etc.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
   detecting impulse noise;
   classifying the detected impulse noise into one of a plurality of impulse noise classes affecting communications on a Digital Subscriber Line (DSL line);
   selecting a noise mitigation strategy from among a plurality of noise mitigation strategies;
   applying the selected noise mitigation strategy; and
   validating application of the noise mitigation strategy, wherein validating the application of the noise mitigation strategy comprises:
      comparing a corrected signal having been filtered or subjected to the selected noise mitigation strategy, or both, with an uncorrected signal.

2. The method of claim 1, wherein classifying the detected impulse noise is based at least in part on a source identification associated with the detected impulse noise, wherein the source identification corresponds to a primary channel or one of a plurality of reference channels.

3. The method of claim 1, wherein the method is performed by an apparatus for removing interference noise, wherein the apparatus comprises:
   an interference canceller coupled with the DSL line and further coupled with a second line, wherein the second line detects the impulse noise.

4. The method of claim 1:
   wherein the method is performed by a modem coupled with the DSL line;
   wherein the modem is further coupled with a second DSL line; and
   wherein the first and second DSL lines each comprise at least one of an active DSL line or an inactive twisted pair telephone line.

5. The method of claim 1, wherein detecting impulse noise comprises an impulse noise characterized as one of:
   a narrowband non-stationary noise causing interference on a narrow range of spectrum; and
   a broadband non-stationary noise causing interference across a broad range of spectrum.

6. The method of claim 1, wherein detecting impulse noise comprises detecting the impulse noise in real-time.

7. The method of claim 6, wherein applying the selected noise mitigation strategy comprises at least one of:
   applying a short-term impulse noise mitigation strategy responsive to detecting the impulse noise in real-time, wherein short-term impulse noise mitigation strategy includes a defined duration to remain in effect; and
   communicating instructions to terminate a long-term noise mitigation strategy affecting operational parameters of the DSL line; wherein the long-term noise mitigation strategy remains in effect until terminated.

8. The method of claim 1, further comprising:
   communicating instructions to implement a long-term noise mitigation strategy affecting operational parameters of the DSL line in near real-time.

9. The method of claim 8, wherein communicating the instructions to implement a long-term noise mitigation strategy comprises sending instructions to alter Error-Correcting Code (ECC) parameters based on detecting the impulse noise in near real-time.

10. The method of claim 1, wherein detecting impulse noise comprises detecting the impulse noise using one or more reference channels, wherein the one or more reference channels are selected from among one or more of:
   a common mode channel on the DSL line communicating via differential mode communication,
   a common mode channel on a twisted pair telephone line co-located with the DSL line which is not used for DSL communications and represented by X2;
   a differential of the two common mode channels X1 and X2, wherein X1 represents the differential mode communication;
   a common mode of the two common mode channels X1 and X2;
   a differential mode channel on a twisted pair telephone line co-located with the DSL line which is not used for DSL communications;
   a reference signal sourced from an antenna; and
   a reference signal sourced from one or more power lines.

11. The method of claim 1, wherein detecting impulse noise comprises multi-channel impulse noise detection based on multiple reference channels.

12. The method of claim 1, wherein detecting the impulse noise comprises:
  pre-processing a signal before the signal is evaluated for presence of an impulse noise based on prior knowledge of an operational environment associated with the DSL line, wherein the pre-processing provides narrowband noise cancellation of stationary noise prior to applying the selected noise mitigation strategy.

13. The method of claim 1, wherein detecting impulse noise comprises:
  filtering a signal from at least one of one or more reference channels; and
  detecting the impulse noise using the at least one of the one or more reference channels by evaluating signals from the at least one of the one or more reference channels for the impulse noise.

14. The method of claim 13, where a signal from at least one of the one or more reference channels is pre-processed based on prior knowledge of an operational environment associated with the DSL line when there is no impulse noise, wherein the pre-processing provides stationary noise prior to applying the selected impulse noise mitigation strategy.

15. The method of claim 1, wherein classifying the detected impulse noise into one of a plurality of impulse noise classes comprises a classifier communicatively interfaced to a plurality of receivers, wherein at least one of the receivers is communicatively interfaced to a one of a plurality of reference channels.

16. The method of claim 1, wherein the plurality of noise mitigation strategies change over time via iterative processing.

17. The method of claim 1, wherein the method further comprises:
  clustering previously observed impulse noises into groups based on characteristics extracted from at least one of the observed impulse noises;
  computing the plurality of noise mitigation strategies from the groups of the previously observed impulse noises; and
  providing the plurality of noise mitigation strategies to a selection engine which selects the noise mitigation strategy from among the plurality of noise mitigation strategies.

18. The method of claim 17, wherein the method further comprises:
  collecting new samples of impulse noises; and
  updating the plurality of noise mitigation strategies based on the new samples of impulse noises.

19. The method of claim 17, wherein computing the plurality of noise mitigation strategies comprises:
  computing multiple noise mitigation strategies for at least one of the groups of previously observed impulse noises and based further on performance of previously attempted mitigation attempts;
  comparing at least one of the multiple noise mitigation strategies for the at least one of the groups; and
  assigning one of the multiple noise mitigation strategies for the at least one of the groups as the noise mitigation strategy for that group.

20. The method of claim 1, wherein at least one of the plurality of noise mitigation strategies includes a cancellation filter to be applied to the communications on the DSL line based on a distinct reference channel corresponding to the at least one of the plurality of noise mitigation strategies.

21. The method of claim 1, wherein classifying the detected impulse noise comprises:
  applying distinct classification filters to one of a plurality of reference channels, wherein at least one of the distinct classification filters correspond to a different class;
  grading effectiveness of the at least one of the distinct classification filters based on a decrease of energy output from at least one of the plurality of reference channels; and
  ranking the distinct classification filters based on the grading to establish a classification for the detected impulse noise.

22. The method of claim 1, further comprising:
  retrieving the plurality of noise mitigation strategies from a remote database.

23. The method of claim 1, wherein applying the selected noise mitigation strategy comprises applying the noise mitigation strategy to the communications on the DSL line before a multiplexor (MUX) resulting in a corrected signal.

24. The method of claim 23, wherein applying the noise mitigation strategy to the communications on the DSL line before the MUX comprises applying the noise mitigation strategy to one of a plurality of copies of the communications on the DSL line; and
  wherein the method further comprises:
    selecting and releasing an un-modified copy of the communications on the DSL line at the MUX when the corrected signal is negatively validated.

25. The method of claim 1, further comprising:
  calculating a cancellation effectiveness measure for the corrected signal when validation is successful; and
  updating the selected noise mitigation strategy with the cancellation effectiveness measure.

26. The method of claim 1, wherein classifying the detected impulse noise into one of a plurality of impulse noise classes comprises:
  determining that a cold-start condition exists;
  identifying a cold-start default class specifying a default filter calculation as the noise mitigation strategy; and
  applying the default filter calculation.

27. The method of claim 1, wherein classifying the detected impulse noise into one of a plurality of impulse noise classes comprises:
  determining that an un-correctable impulse noise event has been detected;
  identifying a DSL signal synchronization class specifying a replacement of the communications on the DSL line with a DSL synchronization signal as the noise mitigation strategy; and
  replacing the communications on the DSL line with the DSL synchronization signal for a time duration corresponding to the detected impulse noise, wherein payload information associated with the communications on the DSL line are lost for the time duration but synchronization is maintained.

28. The method of claim 27, further comprising:
  capturing the un-correctable impulse noise event as a new impulse noise sample; and
  transmitting new impulse noise sample to an entity which generates the plurality of noise mitigation strategies.

29. The method of claim 1, wherein classifying the detected impulse noise into one of a plurality of impulse noise classes comprises:
  determining that an unknown type of impulse noise event has been detected;

identifying a DSL signal synchronization class specifying use of the original DSL communication on the DSL line without modification as the noise mitigation strategy; and communicating the unknown type of impulse noise event to an entity which generates the plurality of noise mitigation strategies, wherein the entity is one of a remote entity which provides the plurality of noise mitigation strategies or a signal conditioning device which provides the plurality of noise mitigation strategies.

30. The method of claim 29, wherein communicating the unknown type of impulse noise event to the entity which generates the plurality of noise mitigation strategies comprises capturing and sending a wave form of the unknown type of impulse noise event for use in updating the plurality of noise mitigation strategies.

31. The method of claim 1, wherein the method is implemented via one of:
a chipset of a Customer Premises Equipment (CPE) modem communicably interfaced with a first end of the DSL line;
a chipset of a signal conditioning device physically separate and distinct from a Customer Premises Equipment (CPE) modem, wherein the CPE modem is communicably interfaced with the first end of the DSL line and wherein the signal conditioning device is communicatively interfaced to the CPE modem;
a controller card configured within a Customer Premises Equipment (CPE) modem communicably interfaced with the first end of the DSL line; and
a controller card configured within a signal conditioning device physically separate and distinct from a Customer Premises Equipment (CPE) modem,
wherein the CPE modem is communicably interfaced with the first end of the DSL line and wherein the signal conditioning device is communicatively interfaced to the CPE modem.

32. The method of claim 1, wherein:
detecting the impulse noise comprises detecting the impulse noise at a Customer Premises Equipment (CPE) modem communicably interfaced with a first end of the DSL line; and
selecting a noise mitigation strategy from among a plurality of noise mitigation strategies comprises receiving the plurality of noise mitigation strategies from a database at a service provider physically separate and distinct from the CPE modem.

33. The method of claim 32, wherein the service provider computes the plurality of noise mitigation strategies on behalf of the CPE modem.

34. The method of claim 32, wherein the database at a service provider is accessible based on a paid service subscription.

35. The method of claim 1, wherein the method is implemented via a signal conditioning device physically separate and distinct from a Customer Premises Equipment (CPE) modem,
wherein the signal conditioning device is communicably interfaced with a first end of the DSL line and wherein the CPE modem is communicatively interfaced to the signal conditioning device; and
wherein the signal conditioning device further pre-computes and stores the plurality of noise mitigation strategies when excess computational resources are available.

36. An apparatus comprising:
an impulse noise detector to detect impulse noise;
a classifier to classify the detected impulse noise into one of a plurality of impulse noise classes affecting communications on a Digital Subscriber Line (DSL line);
a selection engine to select a noise mitigation strategy from among a plurality of noise mitigation strategies;
an impulse noise mitigator to apply the selected noise mitigation strategy; and
a validator to validate application of the noise mitigation strategy, wherein the validator is to validate the application of the noise mitigation strategy by comparing a corrected signal having been filtered or subjected to the selected noise mitigation strategy, or both, with an uncorrected signal.

37. The apparatus of claim 36, further comprising:
a multiplexor (MUX) to release one of a plurality of available signals onto the DSL line as specified by the validator.

38. The apparatus of claim 37:
wherein the impulse noise mitigator is to apply the noise mitigation strategy to the communications on the DSL line before the MUX resulting in a corrected signal;
wherein the noise mitigation strategy is applied to one of a plurality of copies of the communications on the DSL line; and
wherein the MUX is to select and release an un-modified copy of the communications on the DSL line at the MUX when the corrected signal is negatively validated.

39. The apparatus of claim 37:
wherein the validator is to determine that an un-correctable impulse noise event has been detected;
wherein the validator is to identify a DSL signal synchronization class specifying a replacement of the communications on the DSL line with a DSL synchronization signal as the noise mitigation strategy; and
wherein the apparatus further comprises a DSL timing module to provide the DSL synchronization signal as the noise mitigation strategy to the MUX, wherein the MUX is to responsively release the DSL synchronization signal onto the DSL line.

40. The apparatus of claim 36, wherein the classifier is communicably interfaced with a plurality of receivers, at least one of the plurality of receivers being communicatively interfaced with a distinct one of a corresponding number of reference channels.

41. The apparatus of claim 36, further comprising:
a control interface to communicate characteristics extracted from at least one of the observed impulse noises to a clustering engine remote from the apparatus.

42. The apparatus of claim 41, wherein the clustering engine is to:
receive the characteristics extracted from the at least one of the observed impulse noises;
cluster previously observed impulse noises into groups based at least in part on the characteristics extracted from at least one of the observed impulse noises and received by the clustering engine;
compute the plurality of noise mitigation strategies from the groups of the previously observed impulse noises; and
provide the plurality of noise mitigation strategies to the selection engine of the apparatus via a control interface.

43. The apparatus of claim 42, wherein the clustering engine is to:
provide the plurality of noise mitigation strategies to the selection engine of the apparatus via a control interface;

store the plurality of noise mitigation strategies into a database remote from the apparatus; and
send the plurality of noise mitigation strategies to the control interface of the apparatus from the database.

44. The apparatus of claim 41:
wherein the apparatus further comprises a collector to collect new samples of impulse noises;
wherein the control interface of the apparatus is to further upload the new samples of impulse noises to the clustering engine; and
wherein the clustering engine is to update the plurality of noise mitigation strategies based on the new samples of impulse noises uploaded to the clustering engine.

45. The apparatus of claim 41:
wherein the classifier is to determine that an unknown type of impulse noise event has been detected;
wherein the classifier is to identify a DSL signal synchronization class specifying use of the original DSL communication on the DSL line without modification as the noise mitigation strategy; and
wherein the collector is to capture and send a wave form of the unknown type of impulse noise event to the clustering engine via the control interface.

46. The apparatus of claim 36, wherein the apparatus is embodied within one of:
a chipset of a Customer Premises Equipment (CPE) modem communicably interfaced with a first end of the DSL line;
a chipset of a signal conditioning device physically separate and distinct from a Customer Premises Equipment (CPE) modem, wherein the signal conditioning device is communicably interfaced with the first end of the DSL line and wherein the CPE modem is communicatively interfaced to the signal conditioning device;
a controller card configured within a Customer Premises Equipment (CPE) modem communicably interfaced with the first end of the DSL line; and
a controller card configured within a signal conditioning device physically separate and distinct from a Customer Premises Equipment (CPE) modem, wherein the signal conditioning device is communicably interfaced with the first end of the DSL line and wherein the CPE modem is communicatively interfaced to the signal conditioning device.

47. The apparatus of claim 41:
wherein the apparatus is embodied within a signal conditioning device physically separate and distinct from a Customer Premises Equipment (CPE) modem,
wherein the signal conditioning device is communicably interfaced with a first end of the DSL line and wherein the CPE modem is communicatively interfaced to the signal conditioning device; and
wherein the signal conditioning device includes a clustering engine to pre-compute the plurality of noise mitigation strategies when excess computational resources are available within the signal conditioning device, and
wherein the signal conditioning device is to:
store the plurality of noise mitigation strategies within a database of the signal conditioning device,
provide the plurality of noise mitigation strategies to the selection engine, and
enable the signal conditioning device to test for faulty installation scenarios to ensure proper functionality by utilizing hardware to transmit/receive probing signals and couple them with the DSL line side and modem side of the signal conditioning device.

48. The apparatus of claim 36, further comprising:
a pre-processor to pre-process a signal before the impulse noise detector is to evaluate the DSL line to detect the impulse noise;
wherein the pre-processor is to pre-process the signal based on prior knowledge of an operational environment associated with the DSL line when there is no impulse noise, and
wherein the pre-processor is to provide stationary noise cancellation prior to applying the selected impulse noise mitigation strategy.

49. The apparatus of claim 36, further comprising:
a filter to filter noise from the signal based on prior knowledge of an operational environment associated with the DSL line, wherein the filter is to filter a signal from at least one of one or more reference channels.

50. One or more non-transitory computer readable storage media having instructions stored thereon that, when executed by one or more processors of an apparatus, the instructions cause the apparatus to perform operations comprising:
detecting impulse noise;
classifying the detected impulse noise into one of a plurality of impulse noise classes affecting communications on a Digital Subscriber Line (DSL line);
selecting a noise mitigation strategy from among a plurality of noise mitigation strategies;
applying the selected noise mitigation strategy; and
validating application of the noise mitigation strategy, wherein validating application of the noise mitigation strategy comprises:
comparing a corrected signal having been filtered or subjected to the selected noise mitigation strategy, or both, with an uncorrected signal.

51. A system comprising:
an apparatus coupled with a first end of a Digital Subscriber Line (DSL line), the apparatus having therein:
an impulse noise detector to detect impulse noise;
a classifier to classify the detected impulse noise into one of a plurality of impulse noise classes affecting communications on a Digital Subscriber Line (DSL line);
a selection engine to select a noise mitigation strategy from among a plurality of noise mitigation strategies;
an impulse noise mitigator to apply the selected noise mitigation strategy; and
a validator to validate application of the noise mitigation strategy, a clustering engine, wherein the clustering engine is to:
receive characteristics extracted from at least one of the observed impulse noises from the apparatus,
cluster previously observed impulse noises into groups based at least in part on the characteristics extracted from the at least one of the observed impulse noises received by the clustering engine;
compute the plurality of noise mitigation strategies from the groups of the previously observed impulse noises; and
provide the plurality of noise mitigation strategies to the selection engine of the apparatus.

52. The system of claim 51, further comprising:
a database to store the plurality of noise mitigation strategies provided by the clustering engine.

53. The system of claim 52:
wherein the apparatus comprises one of a Customer Premises Equipment (CPE) modem coupled to the first end of the DSL line or a signal conditioning device coupled to the first end of the DSL line at a Customer Premises location; and wherein the clustering engine operates physically remote from the apparatus by a third party distinct from a subscriber of the DSL line and distinct from an operator of the DSL line.

54. A method comprising:

receiving data describing a plurality of impulse noises observed by one or more remote apparatuses;

clustering the plurality of impulse noises into groups;

computing a plurality of noise mitigation strategies from the groups of the observed impulse noises; and providing the plurality of noise mitigation strategies to at least one of the one or more remote apparatuses to mitigate future impulse noises observed by the one or more remote apparatuses.

55. The method of claim 54, wherein the one or more remote apparatuses comprise one of a Customer Premises Equipment (CPE) modem coupled to a first end of a Digital Subscriber Line (DSL line) or a signal conditioning device coupled to the first end of the DSL line at a Customer Premises location.

* * * * *